(12) United States Patent
Wang et al.

(10) Patent No.: US 7,856,100 B2
(45) Date of Patent: Dec. 21, 2010

(54) PRIVACY-PRESERVING DATA AGGREGATION USING HOMOMORPHIC ENCRYPTION

(75) Inventors: Jiahe Helen Wang, Issaquah, WA (US); Qiang Huang, Princeton, NJ (US); David Jao, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1322 days.

(21) Appl. No.: 11/311,916

(22) Filed: Dec. 19, 2005

(65) Prior Publication Data

US 2007/0140479 A1  Jun. 21, 2007

(51) Int. Cl.
*H04K 1/00* (2006.01)
*H04L 9/00* (2006.01)
*H04L 9/30* (2006.01)
*H04L 29/06* (2006.01)
*B41K 3/38* (2006.01)
*G06F 7/04* (2006.01)
*G06F 17/30* (2006.01)
*G06F 7/00* (2006.01)
*G06F 15/00* (2006.01)
*H04N 7/16* (2006.01)

(52) U.S. Cl. ............... 380/30; 380/59; 380/255; 713/150; 726/2; 726/27; 708/200

(58) Field of Classification Search .............. None
See application file for complete search history.

(56) References Cited

U.S. PATENT DOCUMENTS

| | | | |
|---|---|---|---|
| 5,511,191 A | 4/1996 | de Leeuw van Weenen et al. | |
| 5,822,743 A | 10/1998 | Gupta et al. | |
| 5,867,714 A | 2/1999 | Todd et al. | |
| 6,026,163 A * | 2/2000 | Micali | 705/80 |
| 6,108,800 A | 8/2000 | Asawa | |
| 6,192,472 B1 * | 2/2001 | Garay et al. | 713/165 |
| 6,473,659 B1 | 10/2002 | Shah et al. | |
| 6,480,605 B1 * | 11/2002 | Uchiyama et al. | 380/30 |
| 6,671,811 B1 | 12/2003 | Diep et al. | |
| 6,691,249 B1 | 2/2004 | Barford et al. | |
| 6,738,811 B1 | 5/2004 | Liang | |

(Continued)

FOREIGN PATENT DOCUMENTS

| | | |
|---|---|---|
| GB | 2372670 | 8/2002 |
| WO | WO-01/65330 A2 | 9/2001 |
| WO | WO-03/009140 | 1/2003 |

OTHER PUBLICATIONS

Definition: canonical, retrieved Jan. 23, 2009. http://dictionary.die.net/canonical.

(Continued)

*Primary Examiner*—Nasser Moazzami
*Assistant Examiner*—Oscar A Louie
(74) *Attorney, Agent, or Firm*—Perkins Coie LLP

(57) ABSTRACT

A method and system for collecting data from devices using a homomorphic encryption of the data is provided. A collection system of a device adds contributions to homomorphically encrypted data and forwards the requests to another device. When the device receives a reply to the request, it uncombines its contribution to the homomorphic encryption of the data. The device then forwards the reply to the previous device. The initiator device ultimately removes its contribution to the encryption and identifies the data.

13 Claims, 16 Drawing Sheets

U.S. PATENT DOCUMENTS

| | | | |
|---|---|---|---|
| 6,763,482 | B2 | 7/2004 | Bernklau-halvor |
| 6,862,696 | B1 | 3/2005 | Voas et al. |
| 6,880,107 | B1 | 4/2005 | Kraft, IV |
| 6,885,748 | B1* | 4/2005 | Wang .................... 380/201 |
| 6,990,602 | B1 | 1/2006 | Skinner et al. |
| 7,058,861 | B1 | 6/2006 | Adams |
| 7,069,473 | B2 | 6/2006 | Yasuda |
| 7,100,084 | B2 | 8/2006 | Unkle et al. |
| 7,103,874 | B2 | 9/2006 | McCollum et al. |
| 7,134,008 | B2 | 11/2006 | Dutt et al. |
| 7,320,035 | B2 | 1/2008 | Kumar et al. |
| 7,386,839 | B1 | 6/2008 | Golender et al. |
| 7,392,295 | B2 | 6/2008 | Yuan et al. |
| 7,430,598 | B2 | 9/2008 | Raden et al. |
| 7,492,789 | B2 | 2/2009 | Shvodian |
| 7,584,182 | B2 | 9/2009 | Wang et al. |
| 7,584,382 | B2 | 9/2009 | Verbowski et al. |
| 7,694,022 | B2 | 4/2010 | Garms et al. |
| 2001/0005821 | A1 | 6/2001 | Ottosson |
| 2002/0026345 | A1* | 2/2002 | Juels .................... 705/10 |
| 2002/0124187 | A1 | 9/2002 | Lyle et al. |
| 2002/0184555 | A1 | 12/2002 | Wong et al. |
| 2003/0014662 | A1 | 1/2003 | Gupta et al. |
| 2003/0050980 | A1 | 3/2003 | Dutta et al. |
| 2003/0204632 | A1 | 10/2003 | Willebeek-LeMair et al. |
| 2003/0237017 | A1 | 12/2003 | Jibbe |
| 2004/0006546 | A1 | 1/2004 | Wedlake et al. |
| 2004/0093513 | A1 | 5/2004 | Cantrell et al. |
| 2004/0260678 | A1 | 12/2004 | Verbowski et al. |
| 2005/0015639 | A1 | 1/2005 | Cornelius et al. |
| 2005/0102370 | A1 | 5/2005 | Lin et al. |
| 2005/0155031 | A1 | 7/2005 | Wang et al. |
| 2005/0188268 | A1 | 8/2005 | Verbowski et al. |
| 2005/0198110 | A1 | 9/2005 | Garms et al. |
| 2006/0036708 | A1 | 2/2006 | Yuan et al. |
| 2006/0117310 | A1 | 6/2006 | Daniels et al. |
| 2007/0016902 | A1 | 1/2007 | Shozaki et al. |
| 2007/0116283 | A1* | 5/2007 | Tuyls et al. .................. 380/255 |
| 2007/0143280 | A1 | 6/2007 | Wang et al. |
| 2007/0168508 | A1 | 7/2007 | Wang et al. |
| 2007/0300103 | A1 | 12/2007 | Verbowski et al. |
| 2008/0201337 | A1 | 8/2008 | Yuan et al. |
| 2008/0304657 | A1* | 12/2008 | Tuyls et al. .................... 380/28 |

OTHER PUBLICATIONS

Novell Documentation's Aggregate Data, copyright 1999, retrieved Apr. 28, 2008. http://www.novell.com/documentation/extendas37/docs/help/java/jdkee/cloudscape/doc/html/tutorial/virt4.htm.

"Buffer Overrun in RPC Interface Could Allow Code Execution," Microsoft Security Bulletin MS03-026, Microsoft TechNet, revised Sep. 10, 2003, 8 pages, http://www.micrsoft.com/technet/security/bulletin/MS03-026.mspx?pf=true, [last accessed Jul. 21, 2005].

"Byacc—Berkeley YACC," 1 page, http://dickey.his.com/byacc/byacc.html, [last accessed Jul. 22, 2005].

"Change Auditing Solutions—Tripwire, Inc.," © 2005 Tripwire, Inc., http://www.tripwire.com/, [last accessed Jul. 21, 2005].

"DCE 1.1: Remote Procedure Call," Technical Standard, CAE Specification, © Oct. 1997, Published in the U.K. by The Open Group Oct. 1997, 748 pages.

"Flex—a scanner generator—Table of Contents," GNU Project, Free Software Foundation, last updated Nov. 7, 1998, 1 page, http://www.gnu.org/software/flex/manual/, [last accessed Jul. 21, 2005].

"Snort—the de facto standard for intrusion detection/prevention", 1 page, http://www.snort.org/, [last accessed Jul. 22, 2005].

"Unchecked Buffer in Index Server ISAPI Extension Could Enable Web Server Compromise," Microsoft Security Bulletin MS01-033, Microsoft TechNet, updated Nov. 4, 2003, © 2005 Microsoft Corporation, http://www.microsoft.com/technet/security/bulletin/MS01-033.mspx?pf=true, [last accessed Jul. 21, 2005].

"UrlScan Security Tool," Microsoft TechNet, 8 pages, © 2005 Microsoft Corporation, http://www.microsoft.com/technet/security/tools/urlscan.mspx?pf=true [last accessed Jul. 21, 2005].

"Web-to-Host: Reducing the Total Cost of Ownership," The Tolly Group Total Cost of Ownership White Paper, May 2000, 13 pages, © 2000 The Tolly Group.

Agrawal, Rakesh and Ramakrishnan Srikant, "Privacy-Preserving Data Mining," In Proceedings of ACM SIGMOD 2000.

Aguilera, Marcos K. et al., "Performance Debugging for Distributed Systems of Black Boxes," SOSP'03, Oct. 19-22, 2003, ACM 2003, 16 pages.

Apap, Frank et al., "Detecting Malicious Software by Monitoring Anomalous Windows Registry Accesses," RAID 2002, Zurich, Switzerland, pp. 1-13.

Bashar, Mohd A. et al., "Low-Threat Security Patches and Tools," Proceedings of International Conference on Software Maintenance, Oct. 1-3, 1997, Bari, Italy, IEEE Computer Society, pp. 306-313, © 1997 by The Institute of Electrical and Electronics Engineers, Inc.

Beattie, Steve et al., "Timing the Application of Security Patches for Optimal Uptime," 2002 LISA XVI, Nov. 3-8, 2002, Philadelphia, PA, pp. 101-110.

Benaloh, Josh Daniel Cohen, "Verifiable Secret-Ballot Elections," Dissertation, Yale University, Dec. 1996, 132 pages.

Burgess, Mark, "A Site Configuration Engine," USENIX Computing Systems, vol. 8, No. 3, 1995, pp. 1-29.

Canny, John, "Collaborative Filtering with Privacy," 2002 IEEE Symposium on Security and Privacy, p. 45.

Chaum, David and Torben Pryds Pedersen, "Wallet Databases with Observers," Advances in Cryptology—CRYPTO'92, LNCS 740, pp. 89-105, 1993, © Springer-Verlag Berlin Heidelberg 1993.

Chaum, David, "Untraceable Electronic Mail, Return Addresses, and Digital Pseudonyms," Communications of the ACM, Feb. 1981, vol. 24, No. 2, © 1981 ACM, 8 pages.

Chen, Mike Y. et al., "Pinpoint: Problem Determination in Large, Dynamic Internet Services," In Proceedings of International Conference on Dependable Systems and Networks 2002, 10 pages.

Chen, Shuo et al., "A Data-Driven Finite State Machine Model for Analyzing Security Vulnerabilities," Proceedings of the 2003 International Conference on Dependable Systems and Networks (DSN'03), © 2003 IEEE, 10 pages.

Chen, Zesheng et al., "Modeling the Spread of Active Worms," IEEE INFOCOM 2003, © 2003 IEEE, 11 pages.

Clarke, Ian et al., "Freenet: A Distributed Anonymous Information Storage and Retrieval System," Lecture Notes in Computer Science, Springer-Verlag GmbH, ISSN: 0302-9743, vol. 2009 / 2001, Jun. 2003, 21 pages.

Coney, Lillie et al., "Towards a Privacy Measurement Criterion for Voting Systems," Poster paper, National Conference on Digital Government Research, May 2005.

Couch, Alva L. and Michael Gilfix, "It's Elementary Dear Watson: Applying Logic Programming to Convergent System Management Processes," In Proceedings of LISA XIII 1999, Nov. 7-12, 1999, pp. 121-135.

Cramer, Ronald et al., "A Secure and Optimally Efficient Multi-Authority Election Scheme," In Advances in Cryptology—EUROCRYPT'97, vol. 1233 of Lecture Notes in Computer Science, Springer-Verlag, 1997, pp. 103-118.

Cramer, Ronald et al., "Proofs of Partial Knowledge and Simplified Design of Witness Hiding Protocols," Advances in Cryptology—CRYPTO'94, vol. 839 of Lecture Notes in Computer Science, Springer-Verlag, 1994, pp. 174-187.

Douceur, John R., "The Sybil Attack," IPTPS'02 Workshop, Cambridge, MA, Mar. 2002.

Engler, Dawson et al., "Bugs as Deviant Behavior: A General Approach to Inferring Errors in Systems Code," In Proceedings of ACM Symposium on Operating Systems Principles, Oct. 2001, 23 pages.

EP Search Report, Oct. 14, 2005, 4 pages.

Fiat, Amos and Adi Shamir, "How to Prove Yourself: Practical Solutions to Identification and Signature Problems," Advances in Cryptology—CRYPTO'86, LNCS 263, pp. 186-194, 1987, © Springer-Verlag Berlin Heidelberg 1987.

Fielding, R., et al., "Hypertext Transfer Protocol—HTTP/1.1," Jun. 3, 1996, HTTP Working Group, Internet-Draft, 105 pages.

Forrest, Stephanie et al., "A Sense of Self for Unix Processes," In Proceedings of the 1996 Symposium on Security and Privacy, IEEE Computer Society Press, Los Alamitos, CA, pp. 120-128, 1996, © 1996 IEEE.

Freedman, Michael J. et al., "Introducing Tarzan, a Peer-to-Peer Anonymizing Network Layer," IPTPS 2002, 6 pages.

Fujioka, Atsushi, et al., "A Practical Secret Voting Scheme for Large Scale Elections," Advances in Cryptology AUSCRYPT '92, Dec. 13-16, Gold Coast, Queensland, Australia, Dec. 13-16, 1992, © Springer-Verlag Berlin Heidelberg 1993, pp. 244-251.

Ganger, Gregory R. et al., "Finding and containing enemies within the walls with self-securing network interfaces," Technical Report CMU-CS-03-109, Carnegie Mellon University, School of Computer Science, Jan. 2003, 24 pages.

Goldschlag, David et al., "Onion Routing for Anonymous and Private Internet Connections," Jan. 28, 1999, CACM Feb. 1999, 5 pages.

Handley, Mark et al., "Network Intrusion Detection: Evasion, Traffic Normalization, and End-to-End Protocol Semantics," presentation, USENIX Security Symposium 2002, 31 pages.

Hsieh, Hung-Yun and Raghupathy Sivakumar, "A Transport Layer Approach for Achieving Aggregate Bandwidths on Multi-homed Mobile Hosts," MOBICOM'02, Sep. 23-26, 2002, Atlanta, Georgia, © 2002 ACM, 12 pages.

Jakobsson, Markus et al., "Making Mix Nets Robust for Electronic Voting By Randomized Partial Checking," Feb. 1, 2002, USENIX Security'02, pp. 339-353, 2002.

Kamara, Seny et al., "Analysis of Vulnerabilities in Internet Firewalls," Computers & Security, vol. 22, No. 3, Copyright Elsevier 2003, pp. 214-232.

Katz, Jonathan et al., "Cryptographic Counters and Applications to Electronic Voting," EUROCRYPT 2001, LNCS 2045, pp. 78-92, 2001, © Springer-Verlag Berlin Heidelberg 2001.

KaZaa, http://www.kazaa.com, 1 page, [last accessed Jul. 22, 2005].

Keller, Alexander and Christian Ensel, "An Approach for Managing Service Dependencies with XML and the Resource Description Framework," IBM Research Report, RC 22307, Jan. 15, 2002, Computer Science, IBM Research Division, pp. 1-17.

Kissner, Lea and Dawn Song, "Privacy-Preserving Set Operations," Feb. 2005—Last modified Jun. 2005, Carnegie Mellon University, School of Computer Science, CMU-CS-05-113.

Klensin, J., "Simple Mail Transfer Protocol," RFC: 2821, Network Working Group, Standards Track, Apr. 2001, © The Internet Society 2001, 70 pages.

Kohler, Eddie et al., "Programming language techniques for modular router configurations," Technical Report LCS-TR-812, MIT Laboratory for Computer Science, 2000, pp. 1-22.

Kremenek, Ted and Dawson Engler, "Z-Ranking: Using Statistical Analysis to Counter the Impact of Static Analysis Approximations," Proceedings of the 10th Annual International Static Analysis Symposium, Jun. 2003, 21 pages.

Larsson, Magnus and Ivica Crnkovic, "Configuration Management for Component-based Systems," In Proceedings of International Conference on Software Engineering, May 2001, 5 pages.

Liblit, Ben et al., "Bug Isolation via Remote Program Sampling," PLDI '03, Jun. 9-11, 2003, San Diego, California, © 2003 ACM, pp. 141-154.

Microsoft Security Bulletin MS02-039, "Buffer Overruns in SQL Server 2000 Resolution Service Could Enable Code Execution (Q323875)," Microsoft TechNet, updated Jan. 31, 2003, 6 pages.

Moore, David et al., "Code-Red: a case study on the spread and victims of an Internet worm," CAIDA, San Diego Supercomputer Center, University of California San Diego, 12 pages, ACM Internet Measurement Workshop 2002.

Moore, David et al., "Inside the Slammer Worm," Slammer Worm Dissection, IEEE Security & Privacy, Published by IEEE Computer Society, © 2003 IEEE, pp. 33-39.

Moore, David et al., "Internet Quarantine: Requirements for Containing Self-Propagating Code," IEEE INFOCOM 2003, © 2003 IEEE, 10 pages.

Noar, Moni, "Bit Commitment Using Pseudo-Randomness," Feb. 25, 2001, IBM Almaden Research Center, Journal of Cryptology, vol. 4, Proceedings of CRYPTO 1989.

Osterlund, Robert, "PIKT: Problem Informant/Killer Tool," Proceedings of the 14th Systems Administration Conference, 2000 LISA XIV, Dec. 3-8, 2000, New Orleans, Louisiana, © 2000 by The USENIX Association, pp. 147-165.

Paxson, Vern, "Bro: A System for Detecting Network Intruders in Real-Time," Dec. 14, 1999, Computer Networks, 31 (23-24), pp. 2435-2463.

Postel, J. and J. Reynolds, "File Transfer Protocol (FTP)," RFC: 959, Network Working Group, Oct. 1985, pp. 1-69.

Postel, J. and J. Reynolds, "Telnet Protocol Specification," RFC: 854, May 1983, Network Working Group.

Przydatek, Bartosz et al., "SIA: Secure Information Aggregation in Sensor Networks," SenSys '03, Nov. 5-7, 2003, Los Angeles, California, © 2003 ACM, pp. 255-265.

Razmov, Valentin and Daniel R. Simon, "Practical Automated Filter Generation to Explicitly Enforce Implicit Input Assumptions," In Proceedings of the 17th Annual Computer Security Applications Conference, New Orleans, Louisiana, Dec. 2001, 11 pages.

Redstone, Joshua A. et al., "Using Computers to Diagnose Computer Problems," Proceedings of HotOS IX: The 9th Workshop on Hot Topics in Operating Systems, Lihue, Hawaii, May 18-21, 2003, USENIX Association, pp. 91-96.

Reiter, Michael K. and Aviel D. Rubin, "Crowds: Anonymity for Web Transactions," ACM Transactions on Information and System Security, vol. 1, No. 1, Nov. 1998, pp. 66-92, © 1998 ACM.

Rescorla, Eric, "Security holes . . . Who cares?," In Proceedings of USENIX Security Symposium, Aug. 2003, 17 pages.

Ritchey, Ronald W. and Paul Ammann, "Using Model Checking to Analyze Network Vulnerabilities," Security and Privacy 2000, 2000 IEEE Symposium, © 2000 IEEE, pp. 156-165.

Schulzrinne, H. et al., "RTP: A Transport Protocol for Real-Time Applications," Jan. 1996, Network Working Group, RFC 1889, Standards Track, 75 pages.

Shankar, Umesh, "Active Mapping: Resisting NIDS Evasion Without Altering Traffic," Dec. 2002, Report No. UCB//CSD-2-03-1246, Computer Science Division (EECS), University of California Berkeley, 38 pages.

Shannon, C.E., "A Mathematical Theory of Communication," Reprinted with corrections from the Bell System Technical Journal, vol. 27, pp. 379-423, 623-656, July, Oct. 1948.

Sharpe, Richard, "Just what is SMB?" Oct. 8, 2002, 9 pages http://samba.anu.edu.au/cifs/docs/what-is-smb.html [last accessed Jul. 26, 2005].

Silver, Michael A. and Leslie Fiering, "Desktop and Notebook TCO Updated for the 21st Century," Sep. 12, 2003, Gartner Teleconference, http://www.dataquest.com/teleconferences/asset_47431.jsp, [last accessed Jul. 25, 2005].

Singh, Sumeet et al., "The EarlyBird System for Real-Time Detection of Unknown Worms," Technical Report CS2003-0761, University of California at San Diego, 2003, pp. 1-6.

Solomon, David A. and Mark E. Russinovich, "Chapter 5—Management Mechanisms," Inside Microsoft Windows 2000, Third Edition, Microsoft Press, pp. 215-276, © 2000 by David A. Solomon and Mark E. Russinovich.

Staniford, Stuart et al., "How to Own the Internet in Your Spare Time," Proceedings of the 11th USENIX Security Symposium, San Francisco, California, Aug. 5-9, 2002, 20 pages.

Traugott, Steve and Joel Huddleston, "Bootstrapping an Infrastructure," Proceedings of the 12th Systems Administration Conference, LISA XII'98, Dec. 6-11, 1998, Boston, Massachusetts, pp. 181-196, USENIX.

Tripwire, Inc., http://www.tripwire.com/, Accessed Oct. 31, 2005.

Wagner, David, "Resilient Aggregation in Sensor Networks," SASN'04, Oct. 25, 2004, Washington, DC, © 2004 ACM.

Wang, Helen et al., "Friends Troubleshooting Network, Towards Privacy-Preserving, Automatic Troubleshooting," Feb. 2004, IPTPS'04, Springer.

Wang, Helen J. et al., "Automatic Misconfiguration Troubleshooting with PeerPressure," 6th Symposium on Operating Systems Design & Implementation, 2004, USENIX.

Wang, Helen J. et al., "PeerPressure: A Statistical Method for Automatic Misconfiguration Troubleshooting," Nov. 2003, Microsoft Research Technical Report MSR-TR-2003-80, Microsoft Corporation, 13 pages.

Wang, Yi-Min et al., "Persistent-state Checkpoint Comparison for Troubleshooting Configuration Failures," Apr. 4, 2003, Microsoft Technical Report MSR-TR-2003-28, Microsoft Research, Microsoft Corporation, IEEE International Conference on Dependable Systems and Networks, Jun. 2003, © 2003 IEEE.

Wang, Yi-Min et al., "STRIDER: A Black-Box, State-Based Approach to Change and Configuration Management and Support," Proceedings of the 17th Large Installation Systems Administration Conference, 'Oct. 26-31, 2003, San Diego, CA, © 2003 by the USENIX Association, pp. 159-171.

Weaver, Nicholas C., "Warhol Worms: The Potential for Very Fast Internet Plagues," Regents of the University of California, 2001, 9 pages, http://www.csua.berkeley.edu/~nweaver/warhol.html, [last accessed Aug. 10, 2007].

Weaver, Nicholas et al., "Large Scale Malicious Code: A Research Agenda," Mar. 2003, 43 pages.

Williamson, Matthew M., "Throttling Viruses: Restricting propagation to defeat malicious mobile code," HPL-2002-172, Jun. 17, 2002, HP Laboratories Bristol, © Hewlett-Packard Company 2002, 7 pages.

Definition: Dynamically, retrieved May 22, 2010, http://dictionary.reference.com/browse/dynamically, 1 page.

* cited by examiner

PRIVACY-PRESERVING DATA AGGREGATION USING HOMOMORPHIC ENCRYPTION

CROSS-REFERENCE TO RELATED APPLICATION(S)

This patent application is related to U.S. patent application Ser. No. 11/311,443, entitled "Aggregating Information from a Cluster of Peers," and U.S. patent application Ser. No. 11/311,893, issued as U.S. Pat. No. 7,584,182, entitled "Determining Cardinality of a Parameter Using Hash Values," both of which are being filed concurrently and which are hereby incorporated by reference.

BACKGROUND

An ever-increasing number of applications (i.e., computer software) with various features are available to users of personal computers. Users can tailor the operation of these applications to suit their needs by specifying various configuration parameters. For example, a browser application may have a configuration parameter that provides a URL of a web page that is displayed initially whenever the browser application starts (i.e., "a home page"). The browser application may also have configuration parameters that identify what programs are to be invoked to process certain types of content (e.g., a "jpeg" file) and that contain passwords of the user that are to be used when the application connects to various servers. The values of the configuration parameters can be stored in application-specific configuration files such as UNIX resource files, or can be stored in a central registry such as the Windows® registry file. The applications access these files to retrieve the values of the configuration parameters.

If certain configuration parameters have incorrect values, then the applications may exhibit an undesired behavior. For example, if the value of a home page configuration parameter is not set correctly, then when the browser application starts, it will exhibit an undesired behavior by not displaying a home page or displaying the wrong home page. If a configuration parameter incorrectly indicates a certain text editor should be invoked to process a graphics file, then the undesired behavior will be the incorrect displaying of the graphics content. Similarly, if a password configuration parameter has the wrong password, then the failure to connect to the server will be the undesired behavior.

Because of the complexity of applications and their large number of configuration parameters, it can be very time-consuming to troubleshoot which configuration parameters are at fault for causing an application to exhibit the undesired behavior. Most users of personal computers have difficulty performing this troubleshooting. As a result, users typically rely on technical support personnel to assist in the troubleshooting. Not only is this troubleshooting expensive but also users may experience a significant productivity loss as a result of their inability to effectively use an application that is exhibiting an undesired behavior.

Typically, technical support personnel use an ad hoc approach to troubleshoot configuration problems. The personnel using knowledge gained from experiencing similar problems will try to narrow in on the at-fault configuration parameter. This ad hoc approach can take a considerable amount of time and even longer if it is a combination of configuration parameters whose values are incorrect. In some cases, the technical support personnel may compare the values of the configuration parameters to "ideal" values for that application. Because of the large number of configuration parameters available and large number of possible values for each configuration parameter, many of the configuration parameters will have no "ideal" value. Thus, technical support personnel may still need to review the values of all the configuration parameters that could possibly be at-fault configuration parameters.

A troubleshooting system for automatically identifying a configuration parameter that is at fault for causing an application to exhibit an undesired behavior is described in U.S. patent application Ser. No. 10/918,786, entitled "Method and System of Troubleshooting a Misconfiguration of a Computer System based on Configurations of Other Computer Systems" and filed on Aug. 13, 2004, which is hereby incorporated by reference. That troubleshooting system collects configuration information (e.g., configuration parameter names and their values) from computer systems that may have the same application installed. The troubleshooting system then analyzes the configuration parameters of the application that is exhibiting the undesired behavior and the configuration parameters collected from the other computer systems. Based on this analysis, the troubleshooting system identifies which configuration parameter is likely to be at fault for causing the undesired behavior.

The retrieving of configuration information from other computer systems may raise privacy and integrity issues. The privacy issues may relate to configuration information, such as listings of web sites visited, passwords, and so on, that a user may not want to divulge. The integrity issues arise when a computer system lies about its configuration information. The lie may be promulgated because the user of the computer system is malicious or because the integrity of the computer system has been compromised such as by a virus or worm.

A system for retrieving information from computer systems in a way that addresses privacy and integrity issues is described in U.S. patent application Ser. No. 10/918,086, entitled "Method and System for Collecting Information from Computer System based on a Trusted Relationship," and filed on Aug. 13, 2004, which is hereby incorporated by reference. The retrieval system is implemented on a network of devices that communicate with each other via a secure communications link. Each device is directly connected to one or more "friend" devices that it trusts. The retrieval system operates by forwarding a request for data from one friend device to another friend device. Each friend device may optionally add data to the request until all the requested data is added. The request is then returned to the device that initiated the request. The retrieval system defines requests that do not include a history of the devices through which a request has traveled; that is, the requests are "historyless." As a result, a device will only know for sure that a particular request traveled through the friend devices from which it received the request and to which it forwarded the request. In addition, because devices may or may not add data to a request, a device that receives a request from a friend device will not know whether the request includes data of the friend device. Because each device selects the next device to which to send a request, the requests do not identify the devices that will add data; that is, the requests are "futureless."

This retrieval system may, however, be susceptible to privacy-compromising attacks such as gossip attacks and polling attacks. A gossip attack occurs when a device contributes data to a request and the previous friend device and the next friend device collude to determine the data contributed by the device. A polling attack occurs when a friend device repeatedly sends fake requests for data to a device indicating that data from only one more device is needed to determine the data contributed by the device. To help foil both of these types of attacks, the device may only contribute data to the request based on a predetermined probability function. Nevertheless, the attacking "friend" devices may still be able to guess the contributed data using some statistical analysis.

SUMMARY

A method and system for collecting data from devices using a homomorphic encryption of the data is provided. A collection system implemented on peer devices allows data to be collected from the devices by homomorphically encrypting the collected data as the data travels from and back to an initiator device. The collection system of a device receives from a previous device a request for data that includes a public key and a homomorphic encryption of data based on the public key. The collection system then combines the received public key with a device public key to generate a combined public key and combines a homomorphic encryption of device data with the homomorphic encryption of the received data into a homomorphic encryption of the combined data. The collection system then forwards the combined public key and the homomorphic encryption of the combined data to the next device. The reply to the request includes a return public key and a homomorphic encryption of collected data. Upon receiving the reply from the next device, the collection system of the device uncombines from the return public key the device public key. The collection system also uncombines the device public key from the homomorphic encryption of the collected data. The collection system then forwards to the previous device the uncombined public key and the uncombined homomorphic encryption of the collected data. When the initiator device receives the reply to the request, it uncombines its public key from the homomorphic encryption of the collected data. The initiator device then determines the collected data that is represented by the uncombined homomorphic encryption.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
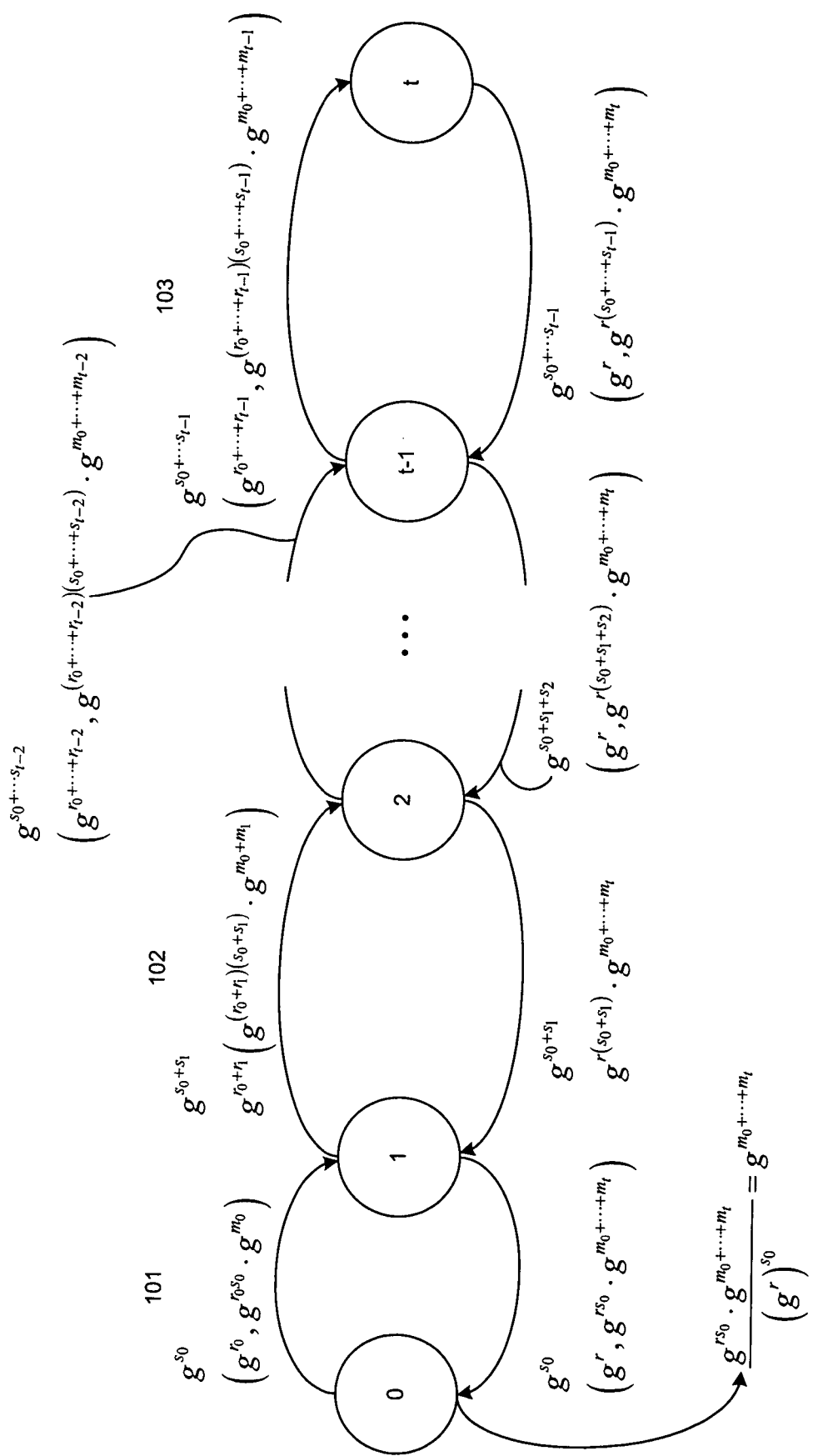
FIG. 1 is a diagram that illustrates the sending of a request and the corresponding reply from device to device in one embodiment of the collection system.

A method and system for collecting data from devices using a homomorphic encryption of the data is provided. A collection system implemented on peer devices allows data to be collected from the devices by homomorphically encrypting the collected data as the data travels from and back to an initiator device. In one embodiment, a collection system of a device receives from a previous device a request for data (e.g., configuration data) that includes a public key and a homomorphic encryption of data based on the public key. The collection system then combines the received public key with a device public key to generate a combined public key. The collection system also generates a homomorphic encryption of device data to be added to the request using the combined public key. The collection system combines the generated homomorphic encryption of the device data with the homomorphic encryption of the received data into a homomorphic encryption of the combined data. The collection system then forwards the combined public key and the homomorphic encryption of the combined data to the next device. The reply to the request includes a return public key and a return homomorphic encryption of collected data. Upon receiving the reply from the next device, the collection system of the device uncombines from the return public key the device public key into an uncombined public key. The collection system also uncombines the device public key from the homomorphic encryption of the collected data. The collection system then forwards to the previous device the uncombined public key and the uncombined homomorphic encryption of the collected data. When the initiator device receives the reply to the request, it uncombines its public key from the homomorphic encryption of the collected data. The initiator device then determines the collected data that is represented by the uncombined homomorphic encryption. In this way, the collection system can aggregate data from various devices while preserving the privacy of the data contributed by the devices.

In one embodiment, the collection system represents public keys and homomorphic encryption based on the group $(G, \cdot)$. The collection system represents the public key as $g^s$ for secret s where $g \in G$ and the homomorphic encryption as $(g^r, g^{rs} \cdot g^m)$ where $g^r$ is the first component x of the received homomorphic encryption of the data and r is a randomly generated number, and where $g^{rs} \cdot g^m$ is the second component y of the received homomorphic encryption of the data and m represents the data. When a device receives a request for data that includes a public key and a homomorphic encryption of data, the collection system of the device generates a device public key and combines the received public key and the device public key into a combined public key as represented by the following:

$$p = g^s \cdot g^{s_i} \qquad (1)$$
$$= g^{s+s_i}$$

where p is the combined public key and $g^{s_i}$ is the device public key for secret $s_i$. The collection system also generates a homomorphic encryption of device data as represented by the following:

$$x_i = g^{r_i} \qquad (2)$$
$$y_i = (g^s \cdot g^{s_i})^{r_i} \cdot g^{m_i}$$
$$= g^{r_i(s+s_i)} \cdot g^{m_i}$$

where $x_i$ and $y_i$ are the first and second components of the encryption of the device data, $r_i$ is a device-specific number (e.g., randomly generated), and $m_i$ is the device data. The homomorphic encryption of the received data and the device data is represented as the homomorphic encryption of the combined data as the following:

$$x' = x \cdot x_i \qquad (3)$$
$$= g^r \cdot g^{r_i}$$
$$= g^{r+r_i}$$
$$y' = y \cdot (g^r)^{s_i} \cdot y_i$$
$$= g^{rs} \cdot g^m \cdot g^{rs_i} \cdot g^{r_i(s+s_i)} \cdot g^{m_i}$$
$$= g^{(r+r_i)(s+s_i)} \cdot g^{m+m_i}$$

where x' is the first component and y' is the second component of the homomorphic encryption of the combined data. The collection system of the device then forwards the request with the combined public key and the homomorphic encryption of the combined data to the next device.

When a device receives the reply from the next device, the reply includes a return public key and a homomorphic encryption of collected data. The homomorphic encryption includes a contribution (e.g., device public key and device specific number) from each device that processed the request. The collection system of the device removes its public key contribution from the return public key $g^s$ and the homomorphic encryption of the collected data $x=g^r$ and $y=g^{rs} \cdot g^m$. To remove its contributions, the collection system uncombines the device public key from the return public key as represented by the following:

$$p' = \frac{g^s}{g^{s_i}} \qquad (4)$$

where p' represents the uncombined public key. The collection system then uncombines the device public key from the second component of the homomorphic encryption as represented by the following:

$$x' = x \qquad (5)$$
$$= g^r$$
$$y' = \frac{y}{(g^r)^{s_i}}$$
$$= \frac{g^{rs} \cdot g^m}{g^{rs_i}}$$
$$= g^{r(s-s_i)} \cdot g^m$$

where x' and y' represent the first and second components of the modified homomorphic encryption of the collected data with the contribution of the public key of the device removed. When an initiator device that started the collection of data receives the reply, the collection system can remove the contribution of the initiator device to the homomorphic encryption to generate $g^m$ where m is the collected data. The collection system can then determine the value of m by calculating $g^j$ for all possible values of j. When $g^m$ equals $g^j$, then the collection system sets the value of m to j.

In one embodiment, the collection system uses homomorphic encryption in conjunction with a cluster-based aggregation scheme to collect data while preserving privacy. A cluster-based aggregation scheme is described in U.S. patent application Ser. No. 11/311,443 entitled "Aggregating Information from a Cluster of Peers," which is filed concurrently and is hereby incorporated by reference. A cluster-based aggregation system aggregates configuration information from friend devices. The aggregation system attempts to foil attacks on the privacy of data contributed to a request by aggregating data from a cluster of friend devices in such a way that it is difficult for a device in the cluster and an attacking device outside the cluster to determine the contribution of an individual device to the data. When a device receives a request for data, the aggregation system of that device identifies a cluster of friend devices whose data is to be aggregated. The aggregation system of the device notifies the devices of the cluster to make a contribution to the request. Each cluster device determines its contribution, divides its contribution into shares, and sends a share of its contribution to every other cluster device. The sum of the shares equals the contribution of the cluster device. Once a cluster device receives the shares from all other cluster devices, it totals the shares of the cluster devices and sends the total of the shares to an exit cluster device. The exit cluster device then aggregates the totals received from each cluster device by summing the totals. The exit cluster device may then forward the request that now includes the aggregated data to another friend device.

In one embodiment, the collection system applies the homomorphic encryption techniques to the cluster-based aggregation system resulting in increased privacy. The entrance cluster device identifies friend devices to be cluster devices. The cluster devices elect an exit cluster device as described above. Each cluster device also generates and distributes its shares as described above. The shares are signed with the sending cluster device's private key, but do not need to be encrypted because no proper subset of the shares reveals any information about the value being distributed. The collection system does, however, homomorphically encrypt the totals that are sent from each cluster device to the exit cluster device. One or more cluster devices are selected as key holder devices. The key holder devices combine to generate a new public key. The entrance cluster device broadcasts the first component $g^r$ of the homomorphic encryption of the received request to each key holder device. Each key holder device generates a secret key $s_i$ and sends $g^{s_i}$ and $g^{rs_i}$ to the entrance cluster device. The entrance cluster device calculates a new public key $g^{s+s_i}$ where $g^s$ is the public key received with the request and $g^{s_i}$ is a product of the public keys of the key holder devices. The entrance cluster device then broadcasts the new public key to the cluster devices. Each cluster device totals the shares it receives from the other cluster devices and homomorphically encrypts the total with a new public key. Each cluster device then sends its homomorphically encrypted subtotal to the exit cluster device. The entrance cluster device operates differently in that it modifies the homomorphic encryption of the total received in the request ($g^r$, $g^{rs} \cdot g^m$) using the new public key. The entrance cluster device then adds the homomorphic encryption of its subtotal to the homomorphic encryption of the received total and forwards it to the exit cluster device. The exit cluster device totals the subtotals received from the cluster devices and forwards the new public key and the homomorphically encrypted total to the next friend device.

When the cluster receives the reply, the collection system routes the reply to each key holder device so that it can uncombine its public key contribution to the public key and the homomorphically encrypted total of the reply. In one embodiment, the collection system routes the reply to each key holder device in a random order. Each key holder device, after uncombining the contribution of its public key from the homomorphic encryption of the total, re-encrypts the data using a randomly generated value. This re-encryption prevents devices from correlating the first component of the homomorphically encrypted data back to its originator. If the key holder devices did not re-encrypt, then the key holder device of the last cluster could store the previous cluster's value of the first component and collude with the initiator device to determine which decrypted subtotal corresponds to the previous cluster's contribution.

As described in U.S. patent application Ser. No. 11/311, 443 entitled "Aggregating Information from a Cluster of Peers," an aggregation system of an initiator device may determine the cardinality of a parameter so that the corresponding parameter vector can have a size large enough to support the number of possible values. The aggregation system determines the cardinality by sending a request for devices to contribute their hash values, using a hash function, of the actual value of the parameter. Since the cardinality of the hash values is known from the hash function, the hash values can be aggregated from a cluster of devices using a hash value contribution vector as described above. The cardinality of the hash values is thus an upper bound on the cardinality of the parameter. When the initiator device receives the contribution of the hash values, it counts the number of non-zero contributions and uses that as the cardinality of the parameter. In one embodiment, the collection system homomorphically encrypts the count of the hash values. The collection system may generate a single homomorphic encryption to represent the combination of all the hash values or may generate a separate homomorphic encryption for each hash value. The collection system may generate a single homomorphic encryption according to the following:

$$E(m) = \left( g^r, g^{rs} \cdot \prod_{i=1}^{c} g_i^{m_i} \right) \quad (6)$$

where $m = (m_1, \ldots, m_c)$ represents the vector of hash values and $g_i$ represents $g$ for each hash value $i$. The selection of the single homomorphic encryption or the multiple homomorphic encryptions may be based on a computation/space complexity trade-off. The single homomorphic encryption requires more complex computation because each possible combination of hash values may need to be generated to recover the vector of hash values. However, the single homomorphic encryption requires the sending of only one value. In contrast, the multiple homomorphic encryptions is less complex computationally, but requires the sending of multiple values. In one embodiment, the collection system may combine the single homomorphic encryption technique and the multiple homomorphic encryption technique to generate a single homomorphic encryption for multiple groups of hash values. For example, the collection system may combine every five hash values into a single homomorphic encryption.

In one embodiment, the collection system allows a cluster to have multiple exit cluster devices to help prevent a malicious troubleshooter device from determining the aggregate contributions from other honest cluster devices by colluding with the exit cluster device. If the malicious troubleshooter device and the exit cluster device collude, then they will be able to determine the aggregate contribution of the cluster devices although not the contribution of the individual cluster devices. To help prevent this collusion, the collection system selects multiple exit cluster devices. Each cluster device member randomly chooses one of them to send the subtotal of the shares it receives from the other cluster devices. Each exit cluster devices then forks or splits the request by forwarding the request with its portion of the contribution of the cluster devices. When a key holder device receives a reply from one of the exit cluster devices, it waits until it receives the other reply and then aggregates the collected data of the replies. Since the reply from an honest exit cluster device is likely to include data collected from other clusters, the aggregation by the key holder device will not compromise the privacy of the cluster devices. Thus, as long as one of the exit cluster devices is honest, then privacy can be preserved. However, since every cluster device contributes an encrypted subtotal of the parameter after cardinality is determined and the replies are concatenated, a troubleshooter device may infer the number of contributing cluster devices by counting the number of encrypted messages contained in the reply returned by the honest exit cluster device. To prevent the troubleshooter device from gaining this knowledge, an honest exit cluster device may randomly select a number of subtotals which sum up to 0, encrypt them, and add the encrypted messages to the reply, if it does not forward the request. If a cluster can have only one exit cluster device, then the cluster devices may all elect not to contribute to the collection to help prevent a troubleshooter attack.

FIG. 1 is a diagram that illustrates the sending of a request and the corresponding reply from device to device in one embodiment of the collection system. An initiator device, device 0, that wants to collect data from peer devices in a recursive trust relationship first generates an initial public key $g^{s_0}$ and a homomorphic encryption of the data ($g^{r_0}$, $g^{s_0} \cdot g^{m_0}$) where $r_0$ is a device-specific number, $s_0$ is the secret of the initiator device, and $m_0$ is the initial data. The initiator device then sends 101 the initial public key and the homomorphic encryption of the initial data to device 1. Upon receiving the public key and the data, device 1 combines its public key with the received public key and the homomorphic encryption of its data with the homomorphic encryption of the received data. The collection system of each device subsequently receives, combines, and sends 102 the request until the last device, device t, receives 103 the request. Upon receiving the public key and the homomorphically encrypted data, the collection system of device t combines its public key with the received public key and the homomorphic encryption of its data with the homomorphic encryption of the received data to generate the homomorphic encryption of the collected data. The collection system of device t then uncombines its public key from the combined public key and the second component of the homomorphic encryption of the collected data. The collection system of device t then sends 104 the reply with the uncombined public key and the homomorphic encryption of the collected data to the previous device, device t-1. Each device that receives a reply uncombines its public key from the return public key and from the homomorphic encryption of the collected data and sends the uncombined public key and the modified homomorphic encryption of the collected data to the previous device. When the initiator device receives the return public key and homomorphic encryption of the collected data, it uncombines its public key and the device-specific numbers from the homomorphic encryption of the collected data, which results in an encryption of the collected data with the contribution of all the public keys and the device-specific number removed. The collection system of the initiator device then determines the value for the collected data from $g^m$.

Figure 2:
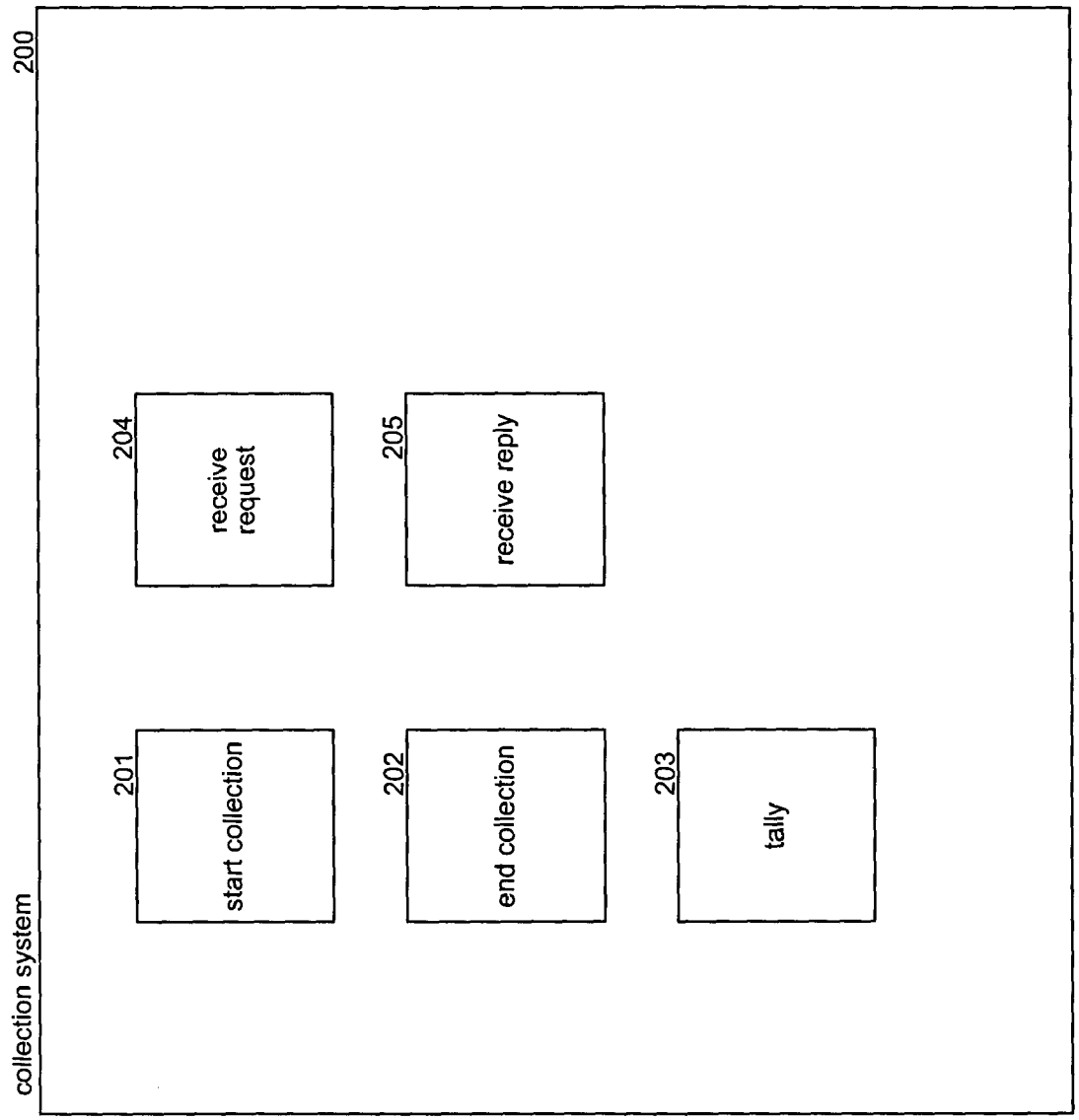
FIG. 2 is a block diagram that illustrates components of the collection system in one embodiment.

FIG. 2 is a block diagram that illustrates components of the collection system 200 in one embodiment. The collection system includes a start collection component 201, an end collection component 202, a generate tally component 203, a receive request component 204, and a receive reply component 205. The start collection component, the end collection component, and the generate tally component are invoked when the device is functioning as an initiator device. The start collection component is invoked to generate the initial public key and a homomorphic encryption of the initial data and to forward the request to a device. The end collection component is invoked when a reply is received by the initiator device. The end collection component uncombines the contribution of the public key and the device-specific number from the homomorphic encryption and identifies the value of the collected data. The end collection component invokes the generate tally component to identify the value of the collected data. The receive request component and the receive reply component are invoked by the collection system when a non-initiator device receives a request and a reply for data. The receive request component contributes its public key to the received public key and a homographic encryption of its device data to the homomorphic encryption of received data. The receive reply component removes the contribution of its public key from the received public key and from the homomorphic encryption of the collected data.

The computing devices on which the collection system may be implemented may include a central processing unit, memory, input devices (e.g., keyboard and pointing devices), output devices (e.g., display devices), and storage devices (e.g., disk drives). The memory and storage devices are computer-readable media that may contain instructions that implement the collection system. In addition, the data structures may be stored or transmitted via a data transmission medium, such as a signal on a communications link. Various communications links may be used to connect components of the system, such as the Internet, a local area network, a wide area network, a point-to-point dial-up connection, a cell phone network, and so on.

Embodiments of the collection system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The devices may include cell phones, personal digital assistants, smart phones, personal computers, programmable consumer electronics, digital cameras, and so on.

The collection system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 3:
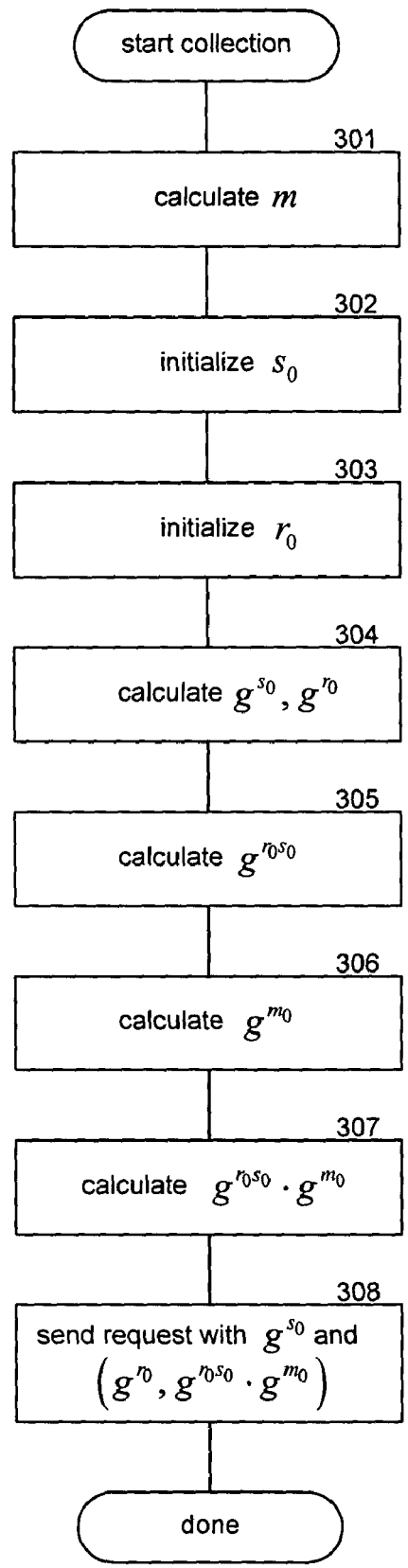
FIG. 3 is a flow diagram that illustrates the processing of the start collection component of the collection system in one embodiment.

FIG. 3 is a flow diagram that illustrates the processing of the start collection component of the collection system in one embodiment. The component is invoked by an initiator device to start collecting data. In block 301, the component generates the initial data m of the collection. In block 302, the component initializes a secret $s_0$ for the initiator device. In block 303, the component initializes a device-specific number $r_0$ (e.g., a random number) for the initiator device. In block 304, the component generates the public key $g^{s_0}$ and the first component $g^{r_0}$ of the homomorphic encryption. In block 305, the component calculates $g^{r_0 s_0}$. In block 306, the component calculates $g^m_0$. In block 307, the component calculates the second component of the homomorphic encryption of the data as $g^{r_0 s_0} \cdot g^{m_0}$. In block 308, the component sends a request for data to a peer device. The request includes the generated public key and the homomorphic encryption of the data. The component then completes.

Figure 4:
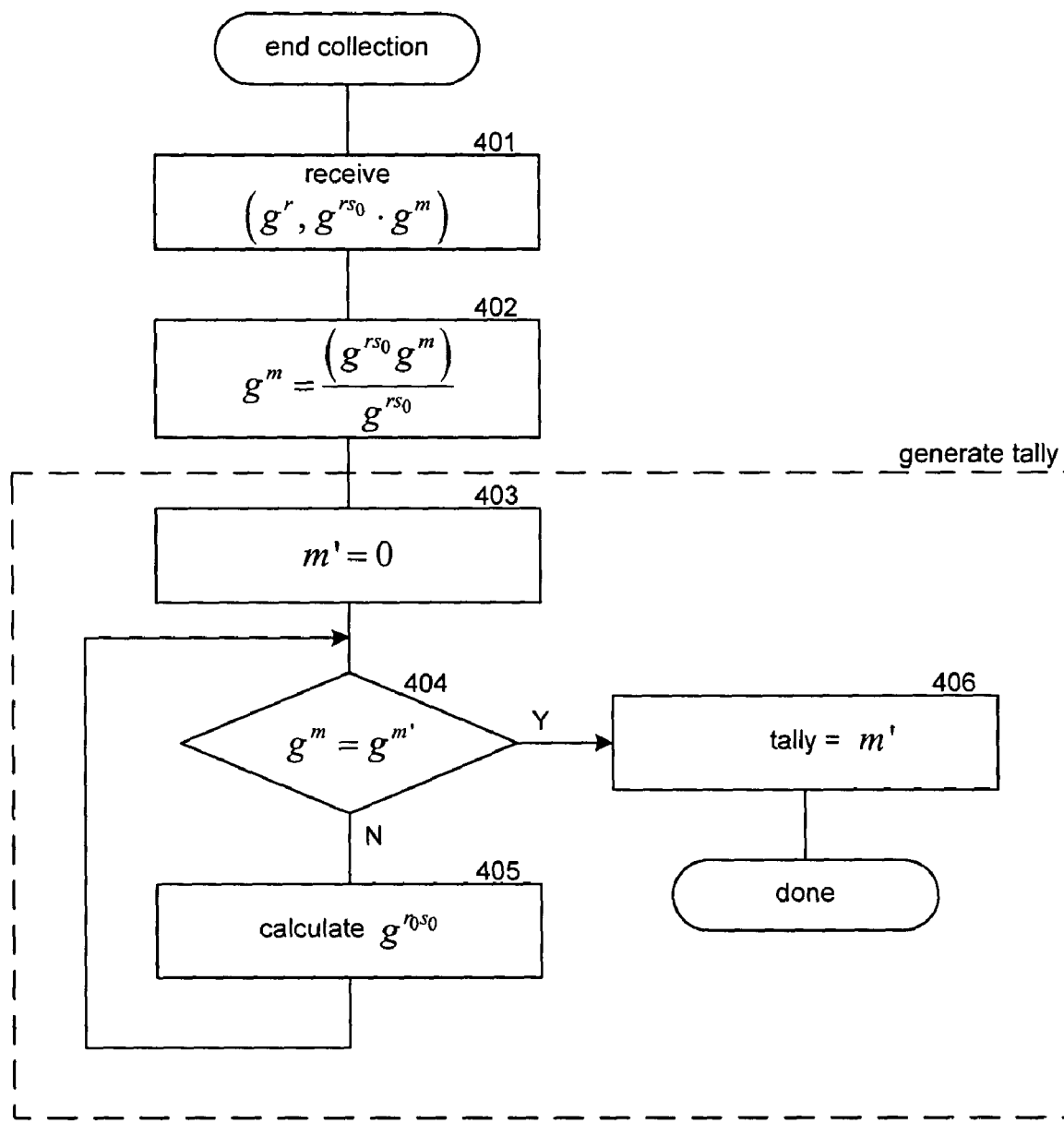
FIG. 4 is a flow diagram that illustrates the processing of the end collection component of the collection system in one embodiment.

FIG. 4 is a flow diagram that illustrates the processing of the end collection component of the collection system in one embodiment. This component is invoked when an initiator device receives a reply to its request to collect data. In block 401, the component receives a public key $g^{s_0}$ and a homomorphic encryption of the collected data $(g^r, g^{r s_0} \cdot g^m)$ of the reply where $g^r$ is the combined first component from all the devices, $s_0$ is the secret of the initiator device, and m is the collected data. Each device removes the contribution of its secret to the second component when it processes the reply leaving only the secret of the initiator device. In block 402, the component uncombines the contribution of the public key of the initiator device from the second component of the homomorphic encryption resulting in $g^m$ where m is the collected data. In blocks 403-406, the component loops determining the value of the collected data m. Because it is too computationally expensive to factor $g^m$, the component calculates the value $g^{m'}$ starting at m' equals 0 and ending when $g^{m'}$ equals $g^m$ indicating that the value of m is m'. In block 403, the component initializes m' to 0. In decision block 404, if $g^{m'}$ equals $g^m$, then the component continues at block 406, else the component continues at block 405. In block 405, the component increments m' and then loops to block 404. In block 406, the component sets the value of m to m' and then completes.

Figure 5:
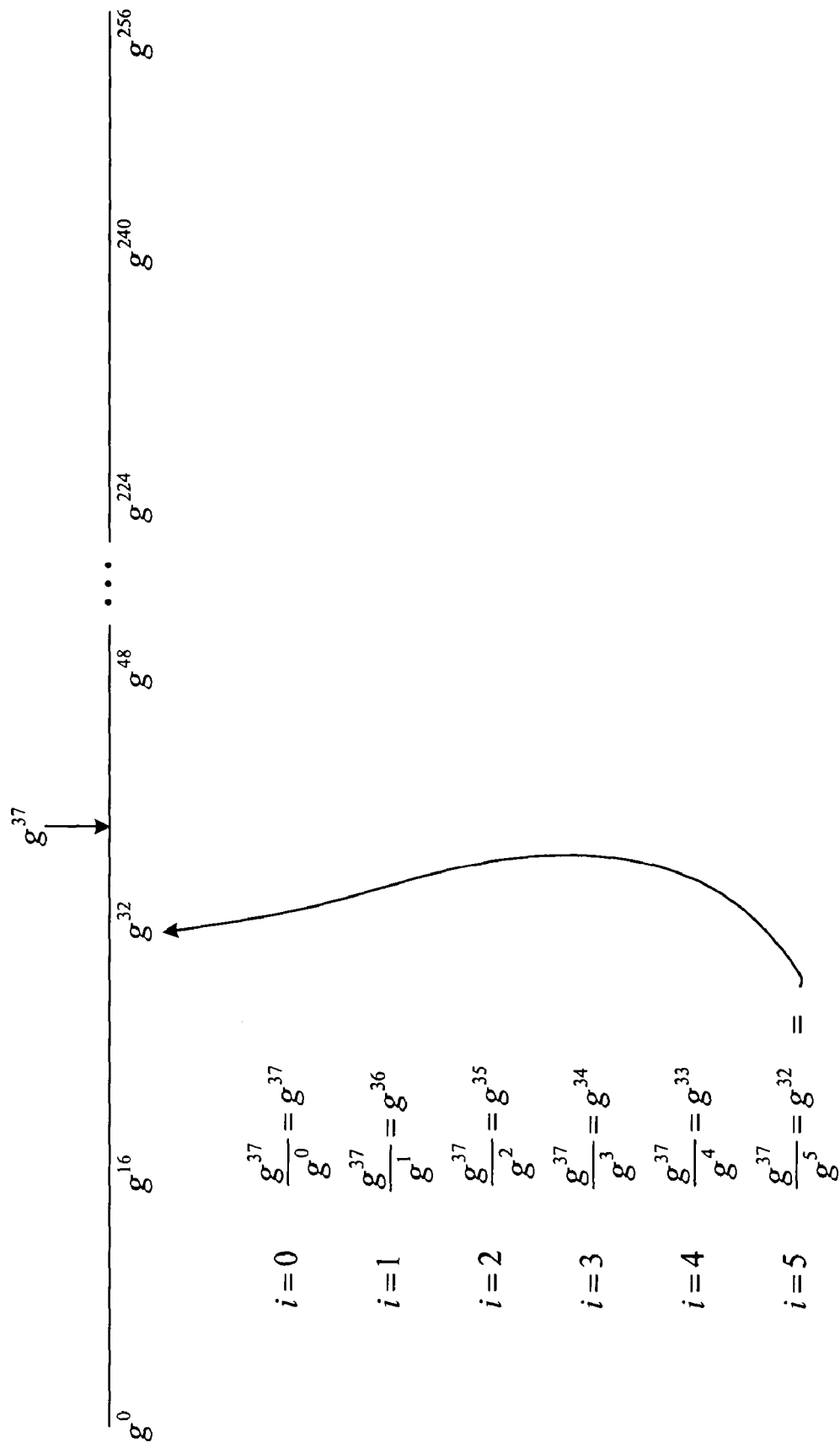
FIG. 5 illustrates a technique for determining the value of m in fewer steps.

The determining of m by incrementing m' results in the calculating of $g^{m'}$ for every value between 0 and m. FIG. 5 illustrates a technique for determining the value of m in fewer steps. The collection system starts out by calculating $g^{j \cdot \lceil \sqrt{t} \rceil}$ for j equals from 0 to $\sqrt{t}$ where t is the maximum value of m. The collection system then calculates $g^{m-0}, g^{m-1}, g^{m-2}, \ldots$ until $g^{m-i}$ equals $g^{j \cdot \lceil \sqrt{t} \rceil}$ for some j. The value of m is then determined to be $i + j \cdot \lceil \sqrt{t} \rceil$. In the example of FIG. 5, m equals 37, t equals 256, and $\lceil \sqrt{t} \rceil$ equals 16. This technique first calculates $g^0, g^{16}, g^{32}$, and so on and then calculates $g^{37}, g^{36}, g^{35}, g^{34}$, $g^{33}$, and $g^{32}$. When the technique determines that $g^{32}$ is equal to g to a power of a multiple of $\lceil\sqrt{t}\rceil$, it stops and calculates the value of m as $i+j\cdot\lceil\sqrt{t}\rceil$.

Figure 6:
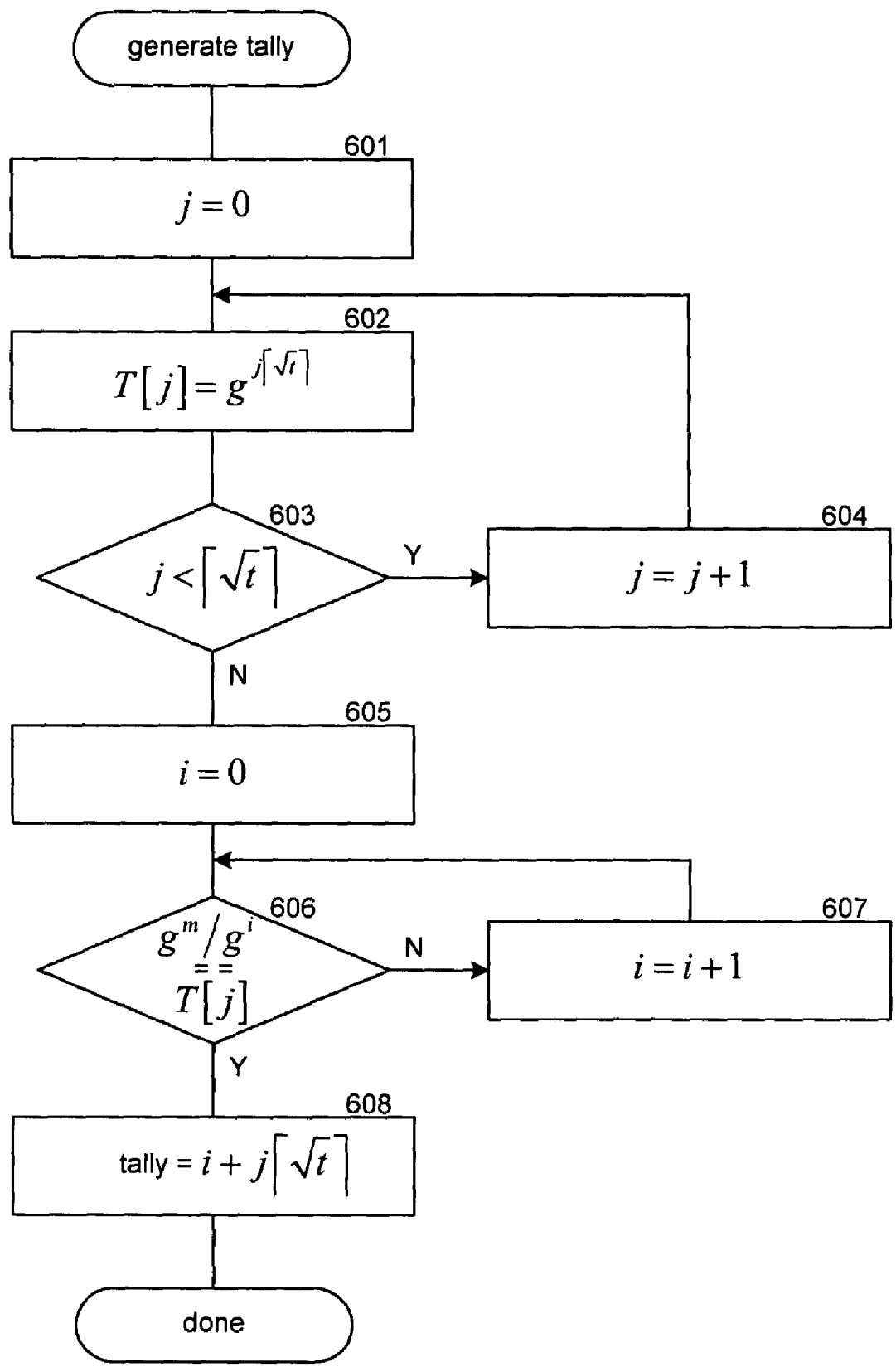
FIG. 6 is a flow diagram that illustrates the processing of the generate tally component of the collection system in one embodiment.

FIG. 6 is a flow diagram that illustrates the processing of the generate tally component of the collection system in one embodiment. The component calculates the values $g^{j\cdot\lceil\sqrt{t}\rceil}$ and then calculates $g^{m-i}$ until $g^{m-i}$ equals $g^{j\cdot\lceil\sqrt{t}\rceil}$ for some j. In blocks 601-604, the component loops calculating $g^{j\cdot\lceil\sqrt{t}\rceil}$. In block 601, the component initializes j. In block 602, the component initializes T[j] to $g^{j\cdot\lceil\sqrt{t}\rceil}$. In decision block 603, if j is less than t, then the component continues at block 604, else the component has completed initializing T and continues at block 605. In block 604, the component increments j and then loops to block 602 to calculate the next value for T. In blocks 605-608, the component loops until $g^{m-i}$ equals T[j] for some j. In block 605, the component initializes i. In decision block 606, if $g^{m-i}$ is equal to T[j] for some j, then the component continues at block 608, else the component continues at block 607. In block 607, the component increments i then loops to block 606. In block 608, the component sets m equal to i+ $j\cdot\lceil\sqrt{t}\rceil$ and then completes.

Figure 7:
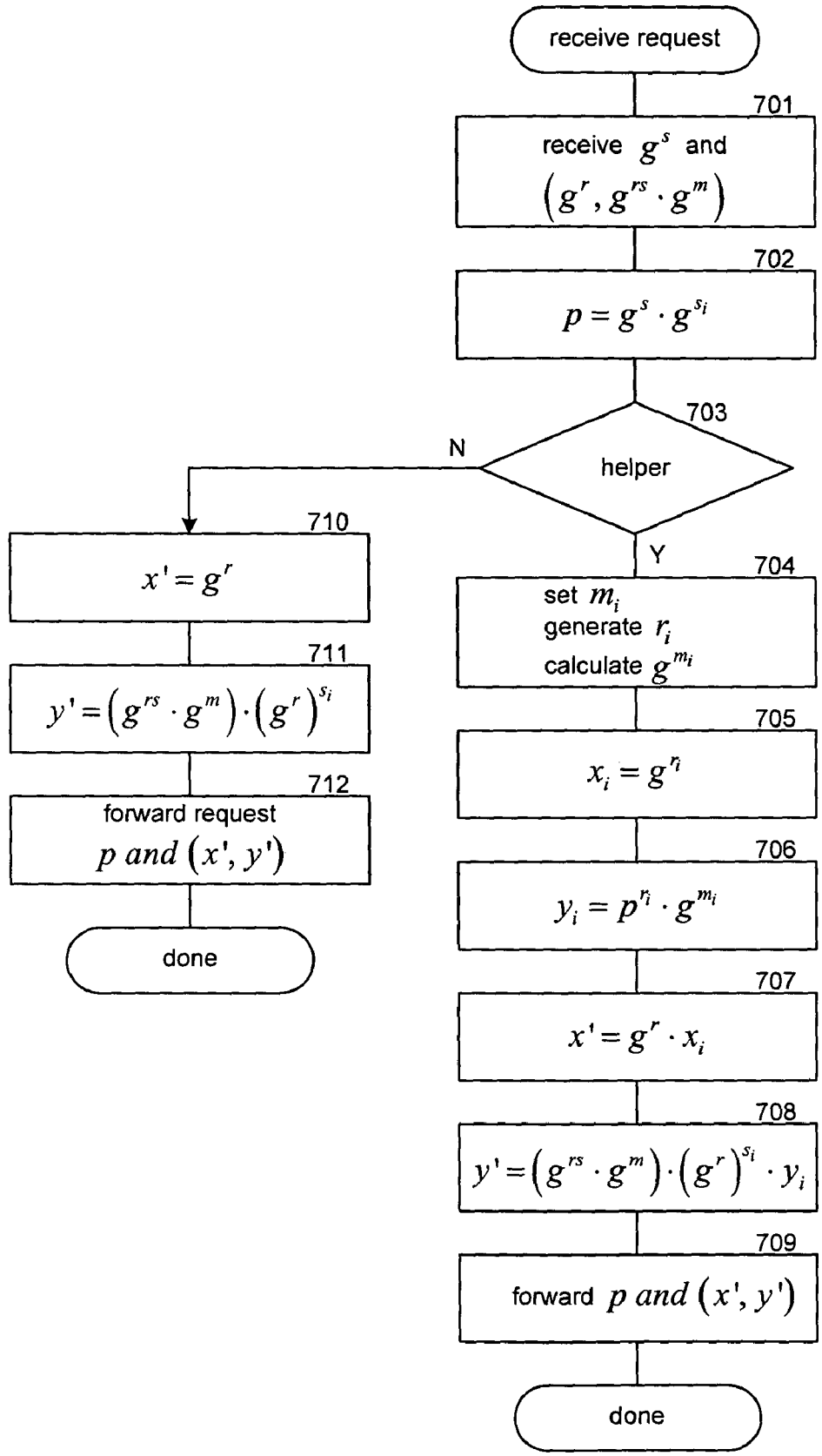
FIG. 7 is a flow diagram that illustrates the processing of the receive request component in one embodiment.

FIG. 7 is a flow diagram that illustrates the processing of the receive request component in one embodiment. The component receives a request from a previous device, adds its contribution to the public key, and decides whether to add its data to the request. If it decides to add its data to the request, it generates a homomorphic encryption of its data based on the combined public key and then adds the homomorphic encryption of its data to the request. If the device decides not to add its data to the request, then it contributes its public key to the homomorphic encryption of the received data. In block 701, the component receives the public key $g^s$ and the homomorphic encryption of the data ($g^r$, $g^{rs}\cdot g^m$). In block 702, the component adds its contribution to the public key p as $g^{s+s_i}$ where $s_i$ is the secret of the device. In decision block 703, if the device decides to contribute its data to the request, then the component continues at block 704, else the component continues at block 710. In block 704, the component retrieves the device data $m_i$, generates a device-specific number $r_i$, and calculates $g^{m_i}$. In block 705, the component sets the first component $x_i$ of the homomorphic encryption of the device data to $g^{r_i}$. In block 706, the component sets the second component $y_i$ of the homomorphic encryption of the device data to ($p^{r_i}\cdot g^{m_i}$). In block 707, the component combines the first component of the device data and the received data into the combined first component $g^{r+r_i}$. In block 708, the component combines the second component of the device data and received data into the combined second component as ($g^{(r+r_i)(s+s_i)}\cdot g^{m+m_i}$). In block 709, the component forwards the combined public key and the homomorphic encryption of the combined data to the next device and then completes. In block 710, the component sets the combined first component to the first component of the received homomorphic encryption. In block 711, the component sets the combined second component to factor in the public key of the device as ($g^{r(s+s_i)}\cdot g^m$). In block 712, the component forwards the public key and the combined homomorphic encryption of the combined data to the next device and completes.

Figure 8:
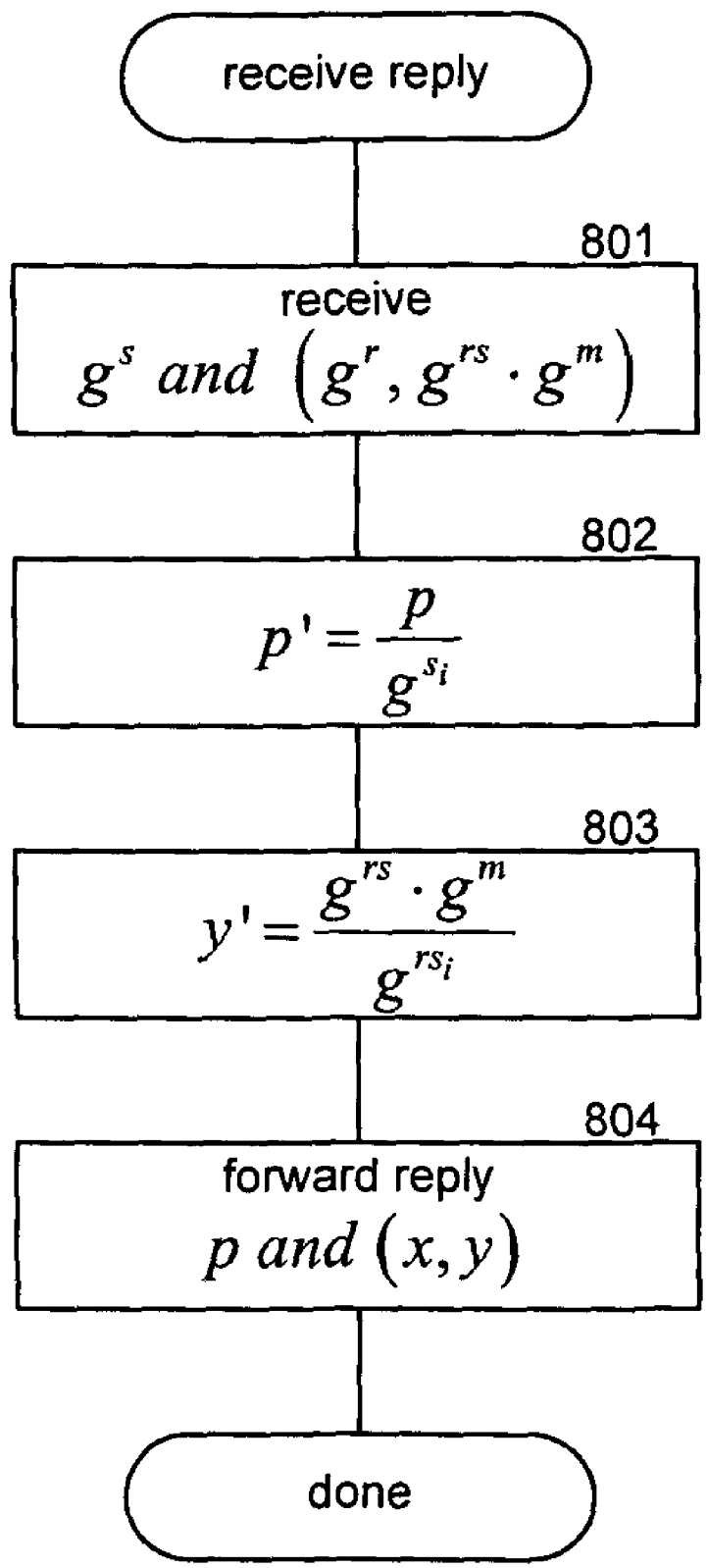
FIG. 8 is a flow diagram that illustrates the processing of the receive reply component of the collection system in one embodiment.

FIG. 8 is a flow diagram that illustrates the processing of the receive reply component of the collection system in one embodiment. The component receives a reply to a request, removes the contribution of its public key, and forwards the reply to the previous device. In block 801, the component receives the reply that includes a public key $g^s$ and a homomorphic encryption of data ($g^r$, $g^{rs}\cdot g^m$). In block 802, the component removes the contribution of the public key of the device from the received public key. In block 803, the component removes the contribution of the public key of the device from the homomorphic encryption of the collected data as represented by the following:

$$y' = \frac{g^{rs}\cdot g^m}{g^{rs_i}} = g^{r(s-s_i)}\cdot g^m \qquad (7)$$

In block 804, the component forwards the reply with the modified public key and modified homomorphic encryption to the previous device and then completes.

Figure 9:
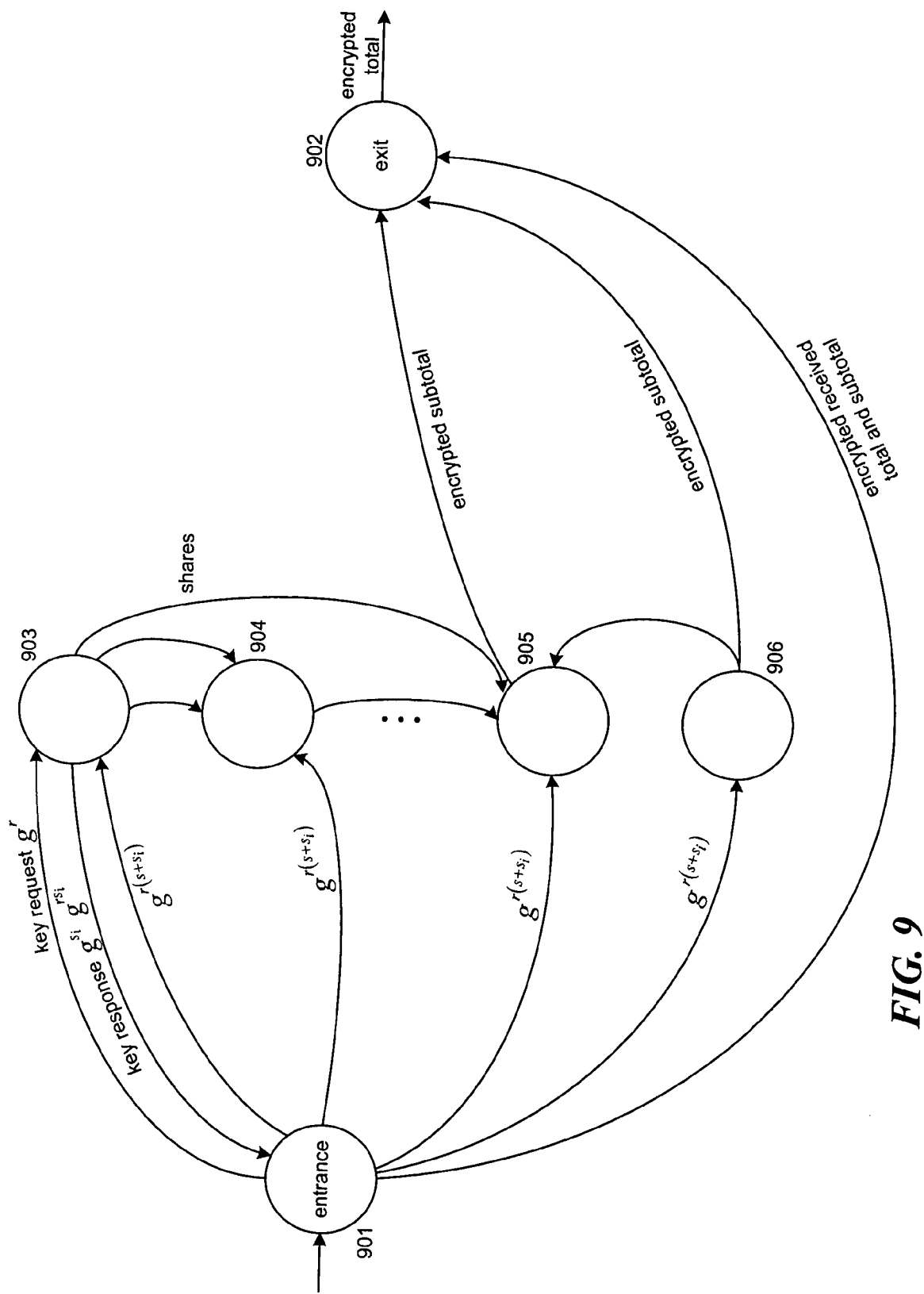
FIG. 9 is a diagram that illustrates the use of homomorphic encryption by a cluster of devices in one embodiment.

FIG. 9 is a diagram that illustrates the use of homomorphic encryption by a cluster of devices in one embodiment. The cluster of devices includes an entrance cluster device 901, an exit cluster device 902, a key holder cluster device 903, and cluster devices 904-906. When the entrance cluster device receives a request that includes a public key $g^s$ and a homomorphic encryption of data ($g^r$, $g^{rs}\cdot g^m$), the entrance cluster device selects the cluster members. An exit cluster device is then elected, and in this example one key holder cluster device is selected. The entrance cluster device sends a key request that includes the first component $g^r$ of the homomorphic encryption of the received data to the key holder cluster device. The key holder cluster device generates a public key $g^{s_i}$ and a new first component $g^{rs_i}$ and provides them to the entrance cluster device. The entrance cluster device then generates a new public key $g^{s+s_i}$ and a new first component $g^{r(s+s_i)}$) for the homomorphic encryption and forwards it to each cluster device. Each cluster device determines its contribution and distributes shares of its contribution to other cluster members. Each cluster member then totals the shares that it receives, generates a new $r_i$ and homomorphically encrypts the total using $g^{(r+r_i)(s+s_i)}$ as the first component. Each cluster device forwards the homomorphically encrypted total to the exit cluster device. The entrance cluster device adds its total to the received total and forwards that homomorphically encrypted total to the exit cluster device. The exit cluster device homomorphically encrypts the total of the subtotals and forwards the new public key and the homomorphically encrypted total to a friend device.

Figure 10:
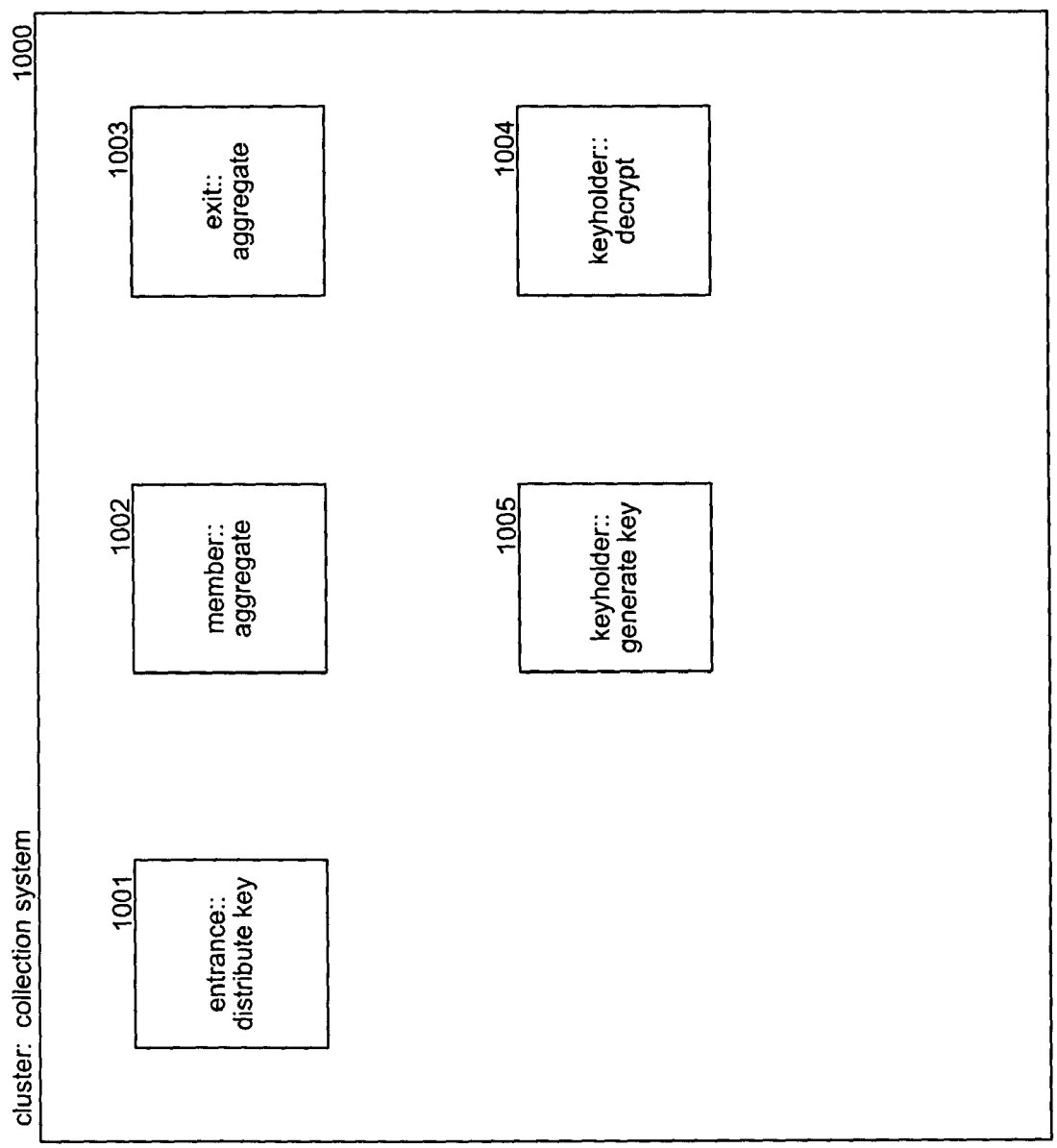
FIG. 10 is a block diagram that illustrates components of the collection system that is cluster-based in one embodiment.

FIG. 10 is a block diagram that illustrates components of the collection system that is cluster-based in one embodiment. The collection system 1000 includes at each cluster device a distribute key component 1001, a member aggregate component 1002, an exit aggregate component 1003, a key holder decrypt component 1004, and a key holder generate key component 1005. The distribute key component is invoked by an entrance cluster device to generate a new public key and distribute the new public key to the cluster devices. The member aggregate component is invoked by a cluster device to aggregate the shares provided by other cluster devices and to homomorphically encrypt the aggregate. The exit aggregate component is invoked by an exit cluster device to aggregate the homomorphically encrypted subtotals provided by the cluster devices. The key holder decrypt component is invoked by a key holder cluster device to remove its contribution to the homomorphically encrypted total. The key holder generate key component is invoked by a key holder cluster device to generate a public key.

Figure 11:
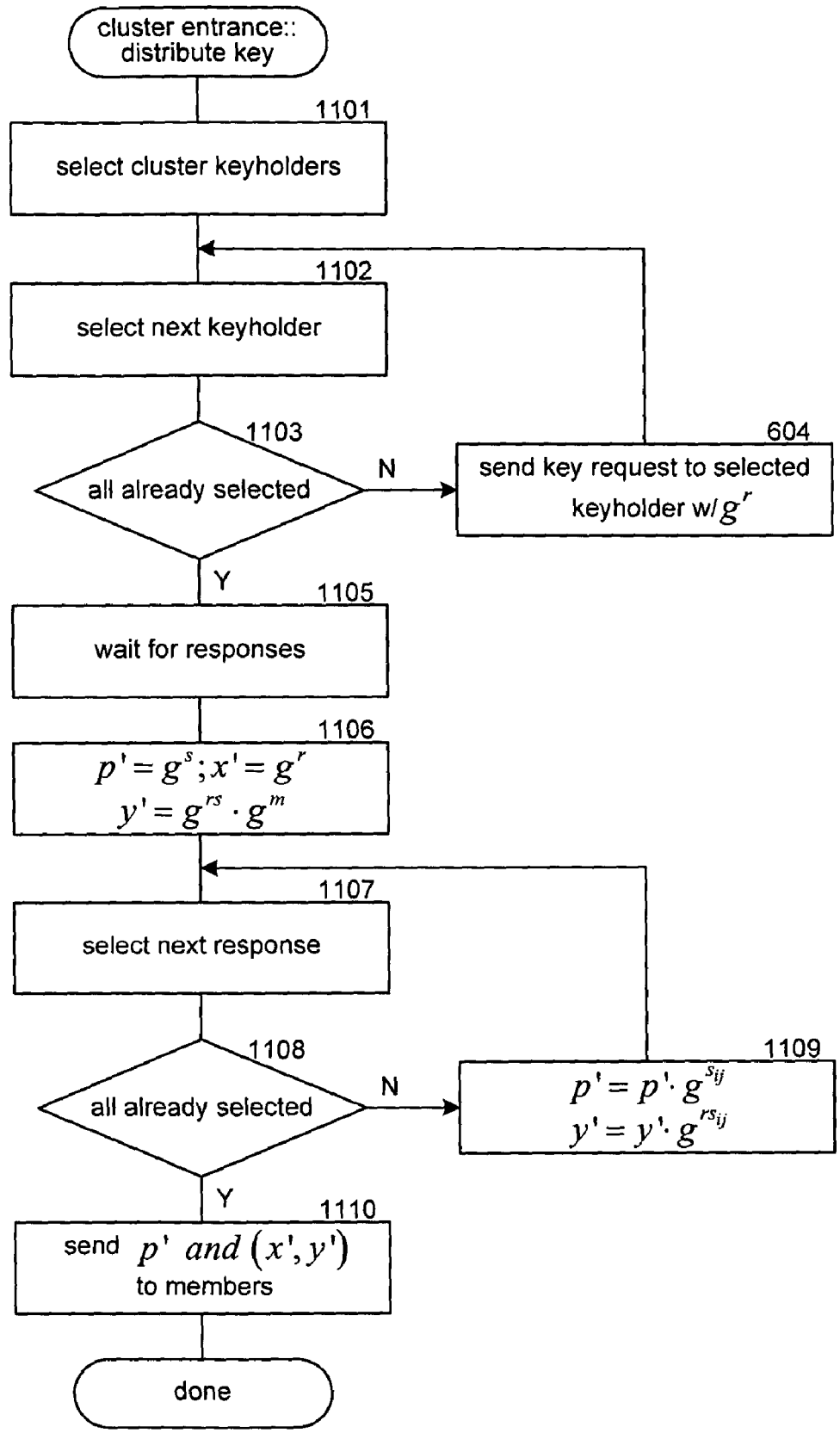
FIG. 11 is a flow diagram that illustrates the processing of the distribute key component of the collection system in one embodiment.

FIG. 11 is a flow diagram that illustrates the processing of the distribute key component of the collection system in one embodiment. The component selects key holder cluster devices, collects their contributions to the new public key, and generates and distributes the new public key to the cluster devices. In block 1101, the component selects the key holder cluster devices. In blocks 1102-1104, the component loops requesting the key holder cluster devices to generate a public key. In block 1102 the component selects the next key holder cluster device. In decision block 1103, if all the key holder cluster devices have already been selected, then the component continues at block 1105, else the component continues at block 1104. In block 1104, the component sends a key request to the selected key holder cluster device along with the first component $g^r$ of the homomorphically encrypted data and then loops to block 1102 to select the next key holder cluster device. In block 1105, the component waits for the responses from the key holder cluster devices. In blocks 1106-1109, the component loops generating a new public key. In block 1106, the component initializes the new public key, and the first and second components of the homomorphic encryption. In block 1107, the component selects the response of the next key holder cluster device. In decision block 1108, if all the responses have already been selected, then the component continues at block 1110, else the component continues at block 1109. In block 1109, the component adds the contribution of the selected response to the new public key and to the first component and then loops to block 1107 to select the next response. In block 1110, the component distributes the new public key and the new first component to the cluster devices and then completes.

Figure 12:
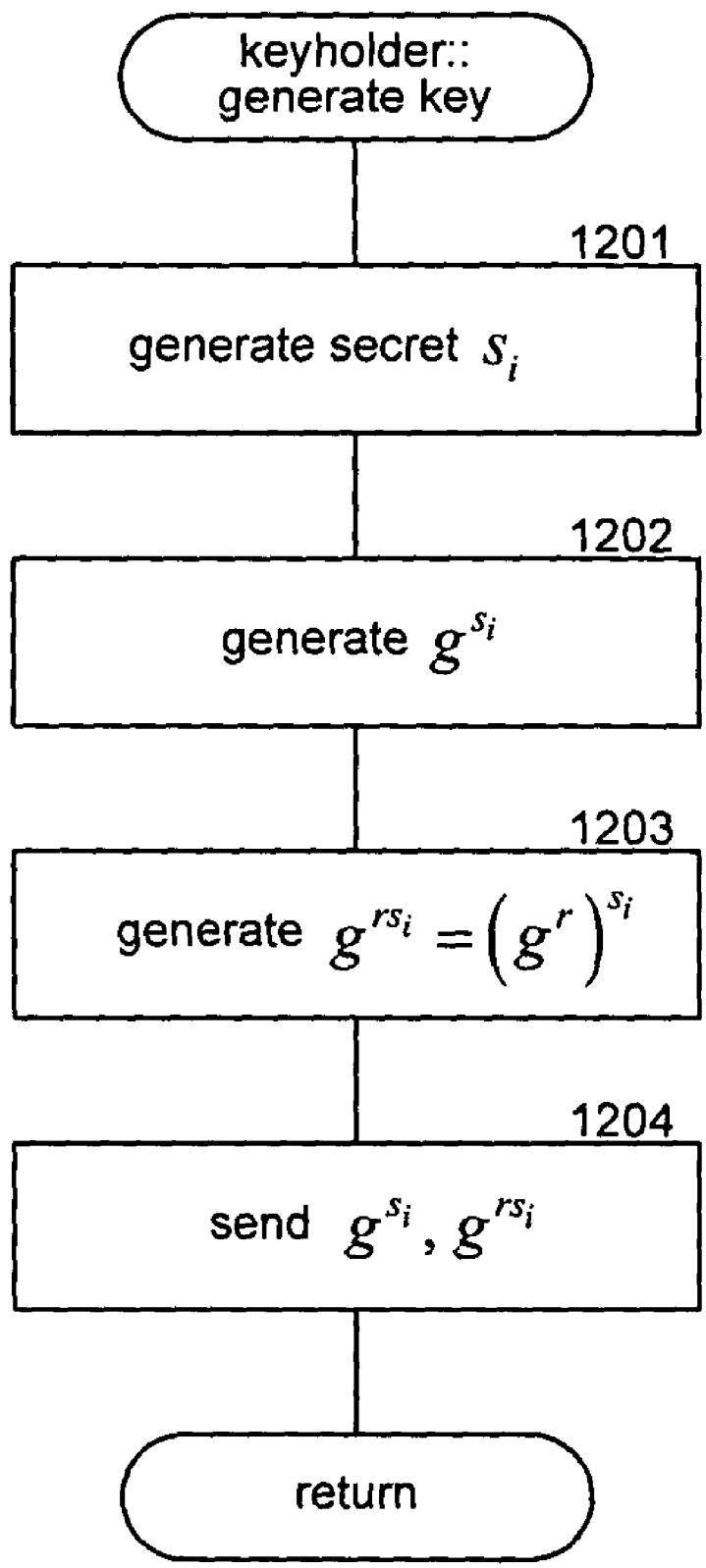
FIG. 12 is a flow diagram that illustrates the processing of the key holder generate key component of the collection system in one embodiment.

FIG. 12 is a flow diagram that illustrates the processing of the key holder generate key component of the collection system in one embodiment. The component is passed the first component of the homomorphic encryption and returns a public key contribution and the first component combined with the public key contribution. In block 1201, the component generates a secret for the key holder device. In block 1202, the component generates the public key for the key holder device. In block 1203, the component generates a new first component that combines the key holder cluster device's public key and the first component. In block 1204, the component sends the public key and the first component to the entrance cluster device and then completes.

Figure 13:
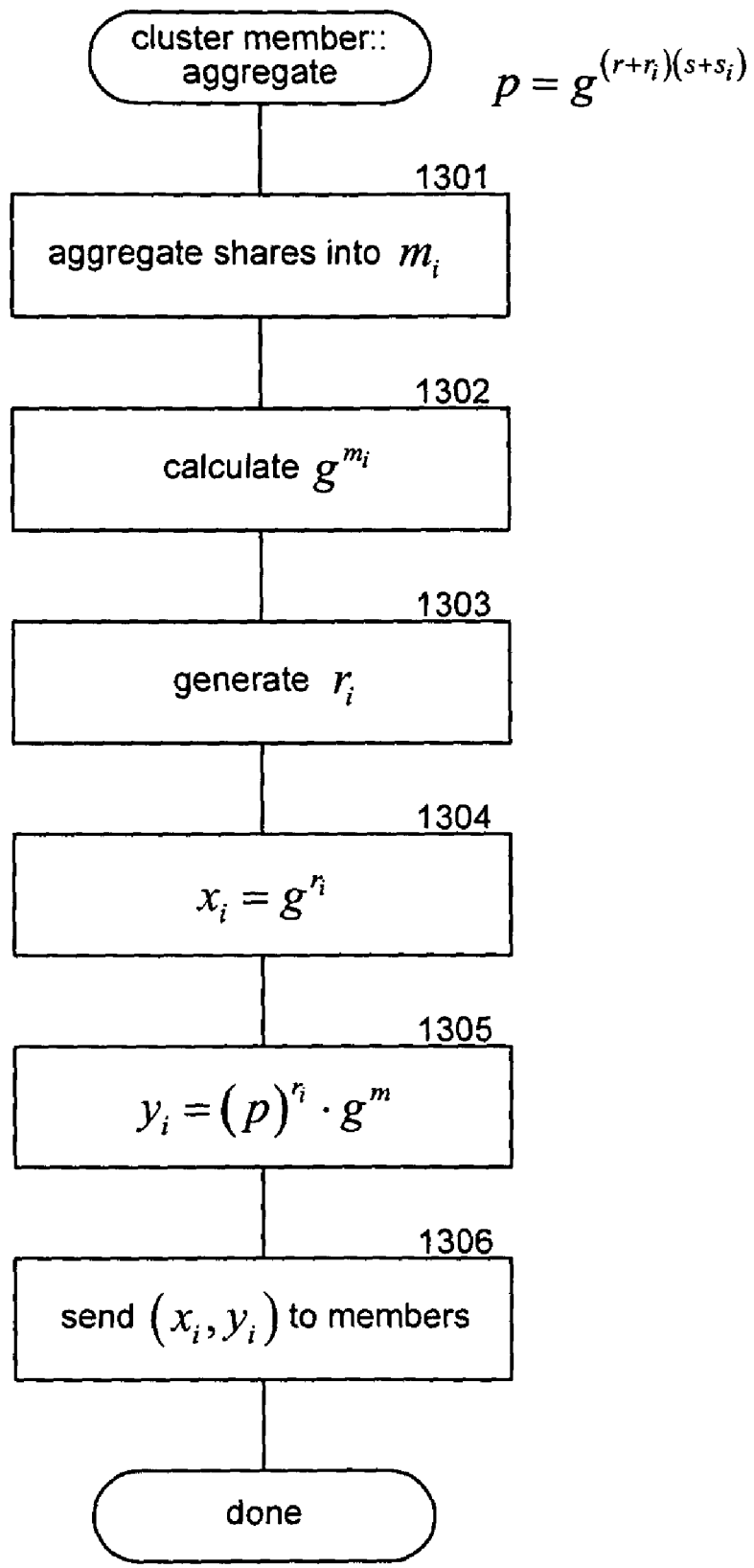
FIG. 13 is a flow diagram that illustrates the processing of the member aggregate component of the collection system in one embodiment.

FIG. 13 is a flow diagram that illustrates the processing of the member aggregate component of the collection system in one embodiment. The component is invoked by a cluster device to aggregate the share contributions of the other cluster members. The component is passed the new public key that was provided by the entrance cluster device. In block 1301, the component aggregates the shares into $m_i$. In block 1302, the component calculates $g^{m_i}$. In block 1303, the component generates a random value $r_i$ for the cluster device. In block 1304, the component sets the first component of the cluster device $x_i$ to $g^n$. In block 1305, the component sets the second component of the cluster device $y_i$ to $(p^n \cdot g^{m_i})$. In block 1306, the component sends the homomorphic encryption of the total to the exit cluster device.

Figure 14:
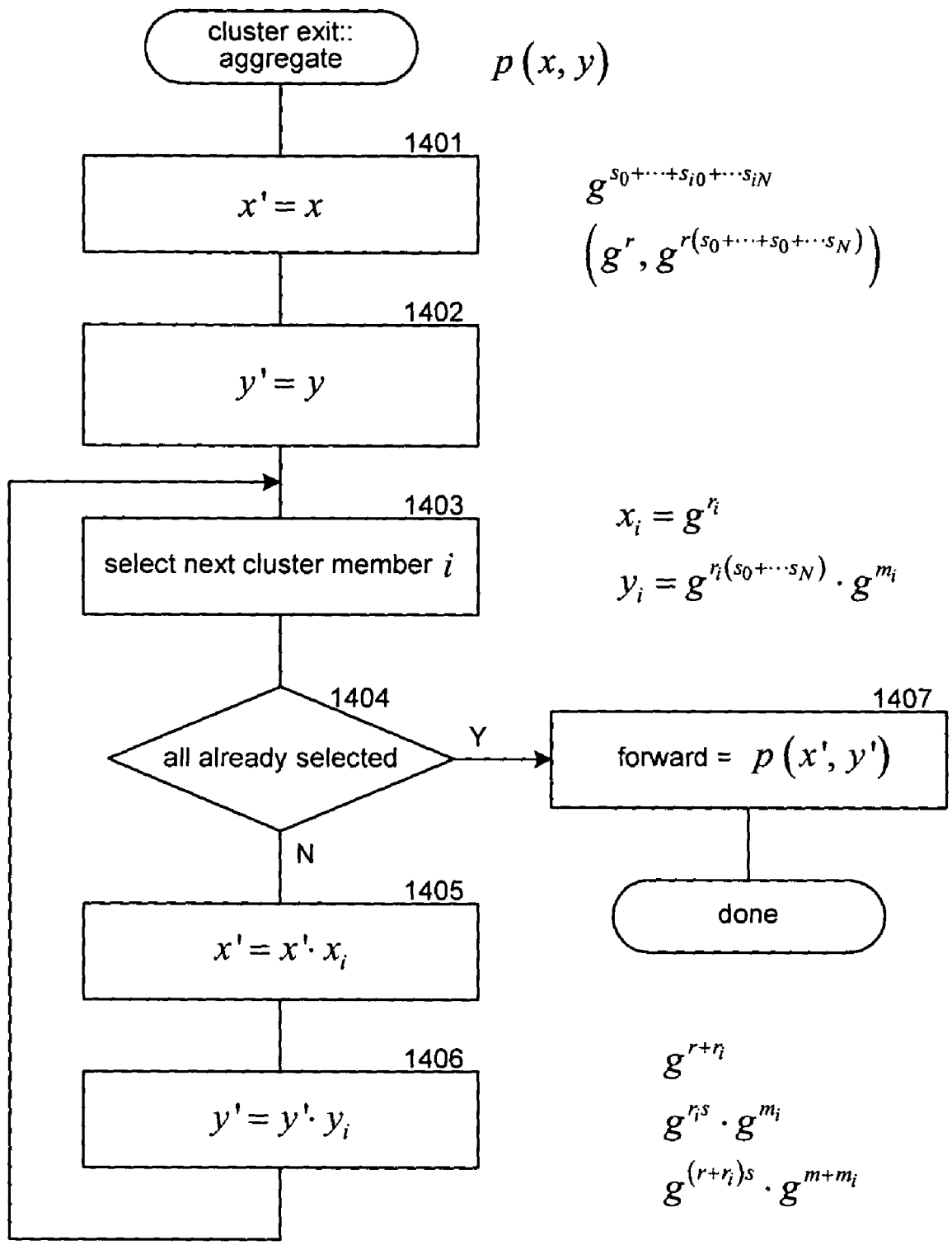
FIG. 14 is a flow diagram illustrating the processing of the exit aggregate component of the collection system in one embodiment.

FIG. 14 is a flow diagram illustrating the processing of the exit aggregate component of the collection system in one embodiment. The component is invoked by a cluster exit device to aggregate the homomorphically encrypted subtotals provided by the cluster devices. In block 1401, the component initializes the aggregate first component to the contribution from the exit cluster device. In block 1402, the component initializes the aggregate second component to the contribution from the exit cluster device. In blocks 1403-1406, the component loops aggregating the contributions from the other cluster devices. In block 1403, the component selects the next cluster device. In decision block 1404, if all the cluster devices have already been selected, the component continues at block 1407, else the component continues at block 1405. In block 1405, the component aggregates the contribution of the first component of the selected cluster device into the aggregate first component. In block 1406, the component aggregates the second component of the selected cluster device into the aggregate second component and then loops to block 1403 to select the next cluster device. In block 1407, the component forwards the request that includes the new public key and the homomorphic encryption of the aggregate data to the next friend device.

Figure 15:
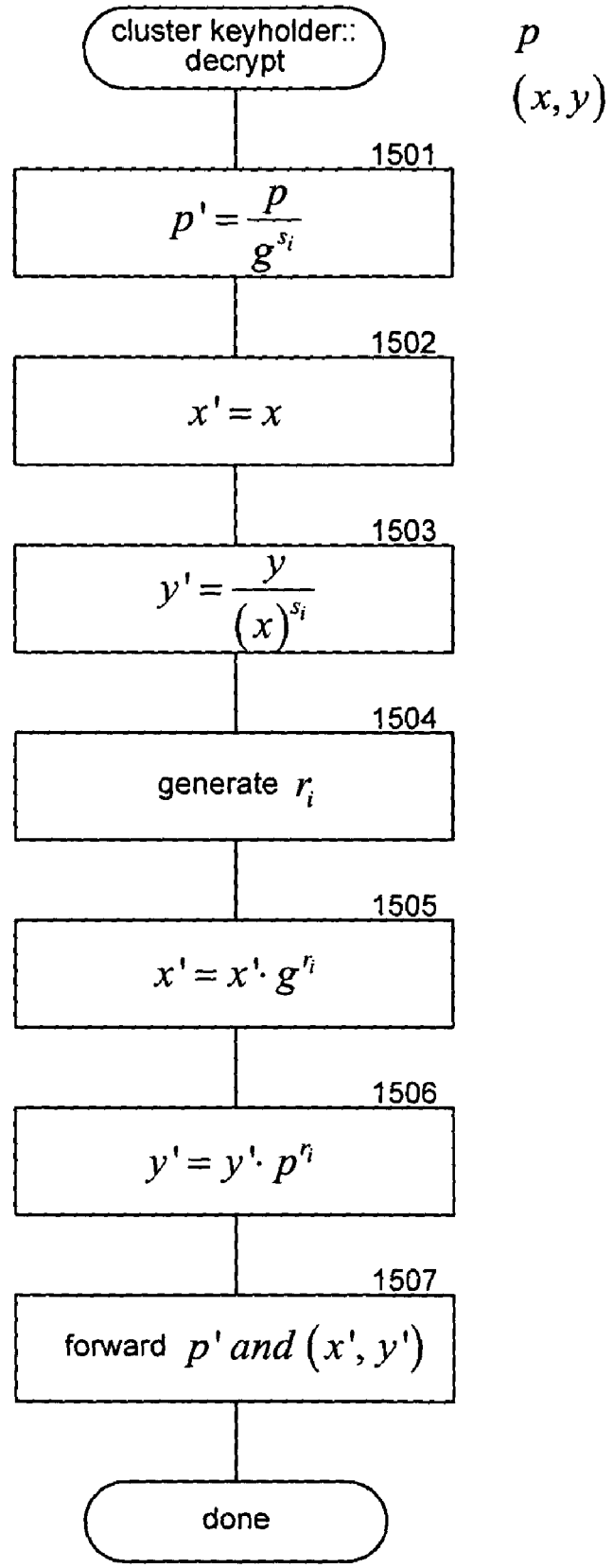
FIG. 15 is a flow diagram that illustrates the processing of the key holder decrypt component of the collection system in one embodiment.

FIG. 15 is a flow diagram that illustrates the processing of the key holder decrypt component of the collection system in one embodiment. The component is invoked when a key holder cluster device receives a reply. In block 1501, the component removes the contribution of the key holder cluster device from the public key. In block 1502, the component sets the first component to the first component of the reply. In block 1503, the component removes the contribution of the key holder cluster device from the second component of the homomorphic encryption. In blocks 1503-1506, the component re-encrypts the homomorphic encryption. In block 1504, the component generates a random value $r_i$. In block 1505, the component adds the contribution of the random value to the first component. In block 1506, the component adds the contribution of the random value to the second component. In block 1507, the component forwards the new public key and first and second components as a reply and then completes.

Figure 16:
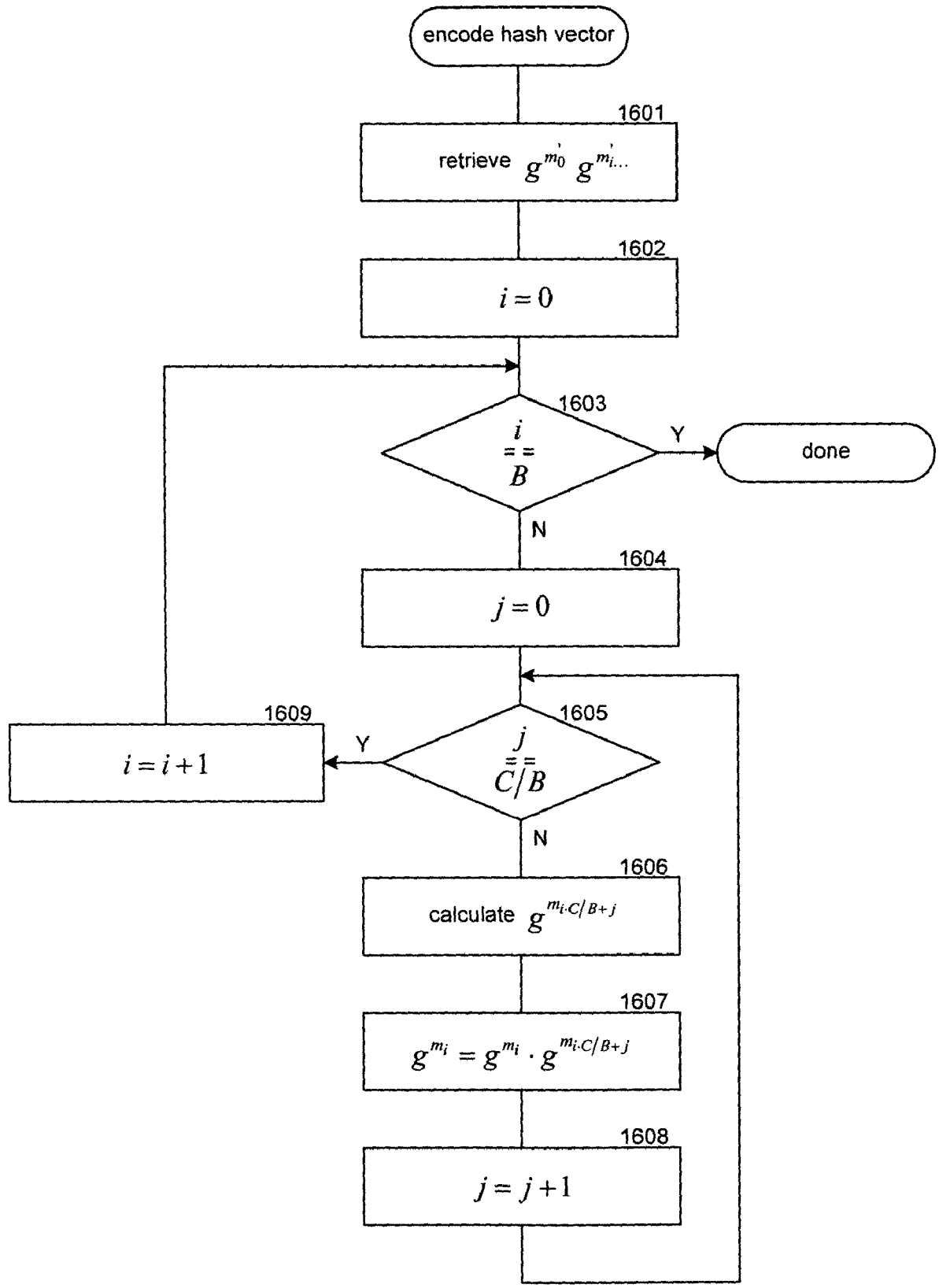
FIG. 16 is a flow diagram that illustrates the processing of an encoding hash vector function in one embodiment.

FIG. 16 is a flow diagram that illustrates the processing of an encoding hash vector function in one embodiment. The component represents multiple hash values as a single homomorphic encryption. In block 1601, the component retrieves the encrypted hash values. In blocks 1602-1609, the component loops combining the passed values of the cluster devices to the homomorphically encrypted hash values. In block 1602, the component initializes an index to select each hash value. In decision block 1603, if the index is equal to the number of homomorphic encryptions B, then the component completes, else the component continues at block 1604. In block 1604-1608, the component loops aggregating hash values into the homomorphic encryption. In block 1604, the component initializes a variable indicating the number of hash values C/B to be aggregated into the homomorphic encryption where C is the number of hash values. In decision block 1605, if the number of hash values already selected is equal to the number to be aggregated, then the component continues at block 1609, else the component continues at block 1606. In block 1606, the component calculates a hash value contribution. In block 1607, the component combines the contribution to the homomorphic encryption for the group of hash values. In block 1608, the component increments to the next hash value and loops to block 1605. In block 1609, the component increments to the next homomorphic encryption and loops to block 1603.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A method in a device that provides data, the method comprising:

receiving by the device from a previous device a request for device data that includes a public key and a homomorphic encryption of received data based on the public key;

combining by the device the received public key with a device public key into a combined public key;

generating by the device a homomorphic encryption of device data to be added to the request using the combined public key;

combining by the device the generated homomorphic encryption of the device data with the homomorphic encryption of the received data into a homomorphic encryption of the combined data; and forwarding by the device to a next device the combined public key and the homomorphic encryption of the combined data wherein $(G, \cdot)$ is a group and $g \in G$ and the homographic encryption of the device data is represented by the following:

$$x_i = g^{r_i}$$

$$y_i = (g^s \cdot g^{s_i})^{r_i} \cdot g^{m_i} = g^{r_i(s+s_i)} \cdot g^{m_i}$$

where $r_i$ is a device-specific number, $g^s$ is the received public key, $g^{s+s_i}$ is the combined public key, $s$ and $s_i$ are secrets for the received and device public keys, and $m_i$ is the device data and wherein $(g^r, g^{rs} \cdot g^m)$ is the homomorphic encryption of the received data and where the combined homomorphic encryption of the data is represented by the following:

$$x' = g^{r+r_i}$$

$$y' = g^{(r+r_i)(s+s_i)} \cdot g^{m+m_i}$$

where x' is a first component and y' is a second component of the combined homomorphic encryption represented by (x', y').

2. The method of claim 1 including:

receiving from the next device a reply that includes a return public key and a homomorphic encryption of collected data;

uncombining from the return public key the device public key;

uncombining from the homomorphic encryption of the collected data the device public key; and forwarding to the previous device the uncombined public key and the uncombined homomorphic encryption of the collected data.

3. The method of claim 2 wherein the uncombined public key is represented by the following:

$$p' = \frac{g^s}{g^{s_i}}$$

where p' is the uncombined public key.

4. The method of claim 3 wherein the uncombined homomorphic encryption of the collected data is represented by the following:

$$x' = g^r$$

$$y' = g^{r(s-s_i)} \cdot g^m$$

where x' and y' are first and second components of the uncombined homomorphic encryption of the collected data encryption represented by (x', y').

5. The method of claim 4 wherein an initiator device upon receiving a reply for data, determines $g^m$ as represented by the following:

$$g^m = \frac{g^{rs} \cdot g^m}{g^{rs_0}}$$

where $s_0$ is the secret of the initiator device.

6. The method of claim 5 wherein the initiator device determines m by comparing $g^m$ to $g^k$ where k represents possible values of m.

7. A method of collecting information of devices of a cluster, the method comprising:

distributing a new public key to devices of the cluster including:

receiving from a previous device a request for data that includes a public key and a homomorphic encryption of data including a first component and a second component;

sending to one or more key holder devices a request for a key holder public key, the request including the first component of the homomorphic encryption of the received data;

receiving from the one or more key holder devices a key holder public key derived from a key holder secret and a key holder device first component that is the first component modified to factor in the key holder public key;

combining the one or more key holder public keys with the received public key into the new public key;

combining the one or more key holder first components with the received first component into a new first component;

providing the new public key to each device of the cluster; and providing the aggregator device of the cluster the second component of the homomorphic encryption; and for each of a plurality of devices of the cluster, sending by that device of the plurality of devices of the cluster to other devices of the cluster shares of information that that device of the plurality of devices of the cluster is to contribute;

for each of a plurality of devices of the cluster, sending by that device of the plurality of devices of the cluster to the aggregator device of the cluster a homomorphic encryption of a total of the shares received from other devices of the cluster based on the new public key; and at the aggregator device, adding by the aggregator device the homomorphic encryption of the totals of the shares received from each of the plurality of devices of the cluster into a homomorphic encryption of aggregate data of the cluster.

8. The method of claim 7 where $(G, \cdot)$ is a group and $g \in G$, $g^s$ is a public key for secret s, and the homographic encryption of data is $(g^r, g^{rs} \cdot g^m)$, with $g^r$ being the first component and $g^{rs} \cdot g^m$ being the second component, wherein a key holder first component $x_i$ is represented by the following:

$$p_i = g^{s_i}$$

$$x_i = g^{rs_i}$$

where $p_i$ is the public key contribution of key holder device i; $x_i$ is the first component contribution of key holder device i; and $s_i$ is a secret of key holder device i.

9. The method of claim 8 wherein the new public key and the first component are represented by the following:

$$p' = g^{s+s_0+\ldots+s_n}$$

$$x' = g^{r(s+s_0+\ldots+s_n)}$$

where n is the number of the key holder device.

10. A method of collecting information of devices of a cluster, the method comprising:

distributing a new public key to devices of the cluster;

for each of a plurality of devices of the cluster, sending by that device of the plurality of devices of the cluster to other devices of the cluster shares of information that that device of the plurality of devices of the cluster is to contribute;

for each of a plurality of devices of the cluster, sending by that device of the plurality of devices of the cluster to an aggregator device a homomorphic encryption of a total of the shares received from other devices of the cluster based on the new public key; and at the aggregator device, adding by the aggregator device the homomorphic encryption of the totals of the shares received from each of the plurality of devices of the cluster into a homomorphic encryption of aggregate data of the cluster wherein $(G,\cdot)$ is a group and $g \in G$ and the homographic encryption of data is $(g^r, g^{rs} \cdot g^m)$ with $g^r$ being a first component of $(G,\cdot)$ and $g^{rs} \cdot g^m$ being a second component of $(G,\cdot)$ and wherein a device of the cluster totals shares based on the new public key as represented by the following:

$$x_j = g^{r_j}$$

$$y_j = g^{r_j s_i} \cdot g^{m_j}$$

where $x_j$ is a first component for device j and $y_j$ is a second component for device j, $r_j$ is a device-specific number, $g^s$ is the new public key, and $m_j$ is the total of the shares sent to the device j.

11. The method of claim 10 including forwarding the request with the aggregated homomorphic data to a next device; and upon receiving a response to the request including a return public key and a homomorphic encryption of collected data, modifying the return public key and the second component of the homographic encryption of the collected data to remove the contribution of each key holder device to the public key.

12. The system of claim 11 wherein the data is configuration data.

13. A computer system configured for collecting data from devices, the system including:

a memory storing computer-executable instructions of:

a component that receives a request for device data that includes a public key from a previous device and a homomorphic encryption of received data;

a component that generates a new public key;

a component that homomorphically encrypts a combination of the homomorphic encryption of the received data and device data;

a component that forwards the new public key and the homomorphic encryption of the combined data to a next device;

a component that receives a reply for data that includes a public key and a homomorphic encryption of collected data a component that uncombines the contribution of the device to the received public key and the homomorphic encryption of the combined data and a component that forwards the reply to the previous device;

wherein the device is a cluster device of a cluster that contributes to the collected data by distributing shares of its contribution to other cluster devices and that totals the shares received from other cluster devices and forwards the totals to an aggregator device for aggregating into the total contribution of the cluster; and a processor for executing the computer-executable instructions stored in the memory.

* * * * *